United States Patent
Medved et al.

(10) Patent No.: US 9,893,951 B1
(45) Date of Patent: *Feb. 13, 2018

(54) SCHEDULED NETWORK LAYER PROGRAMMING WITHIN A MULTI-TOPOLOGY COMPUTER NETWORK

(71) Applicant: Juniper Networks, Inc., Sunnyvale, CA (US)

(72) Inventors: Jan Medved, Pleasanton, CA (US); David Ward, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,861

(22) Filed: Sep. 6, 2016

Related U.S. Application Data

(63) Continuation of application No. 14/473,766, filed on Aug. 29, 2014, now Pat. No. 9,438,508, which is a continuation of application No. 13/340,191, filed on Dec. 29, 2011, now Pat. No. 8,824,274.

(51) Int. Cl.
*H04L 12/24* (2006.01)
*H04L 12/751* (2013.01)
*H04L 12/813* (2013.01)

(52) U.S. Cl.
CPC .......... *H04L 41/12* (2013.01); *H04L 45/02* (2013.01); *H04L 47/20* (2013.01)

(58) Field of Classification Search
None
See application file for complete search history.

(56) References Cited

U.S. PATENT DOCUMENTS

| | | | |
|---|---|---|---|
| 8,339,959 B1 | 12/2012 | Moisand et al. | |
| 8,422,360 B2 | 4/2013 | Shimizu et al. | |
| 8,483,123 B2 | 7/2013 | Zheng et al. | |
| 8,606,847 B2 | 12/2013 | Raghunath et al. | |
| 8,688,775 B2 | 4/2014 | Penno et al. | |

(Continued)

OTHER PUBLICATIONS

Advisory Action from U.S. Appl. No. 14/336,535, dated Dec. 30, 2016, 3 pp.

(Continued)

*Primary Examiner* — Chi H Pham
*Assistant Examiner* — Raul Rivas
(74) *Attorney, Agent, or Firm* — Shumaker & Sieffert, P.A.

(57) ABSTRACT

In general, techniques are described for dynamically scheduling and establishing paths in a multi-layer, multi-topology network to provide dynamic network resource allocation and support packet flow steering along paths prescribed at any layer or combination of layers of the network. In one example, a multi-topology path computation element (PCE) accepts requests from client applications for dedicated paths. The PCE receives topology information from network devices and attempts to identify paths through a layer or combination of layers of the network that can be established at the requested time in view of the specifications requested for the dedicated paths and the anticipated bandwidth/capacity available in the network. The PCE schedules the identified paths through the one or more layers of the network to carry traffic for the requested paths. At the scheduled times, the PCE programs path forwarding information into network nodes to establish the scheduled paths.

18 Claims, 16 Drawing Sheets

(56) References Cited

U.S. PATENT DOCUMENTS

| | | |
|---|---|---|
| 8,693,974 B2 | 4/2014 | Peczalski |
| 8,700,801 B2 | 4/2014 | Medved et al. |
| 8,787,983 B2 | 7/2014 | Kim |
| 8,787,154 B1 | 9/2014 | Medved et al. |
| 8,824,274 B1 | 9/2014 | Medved et al. |
| 8,885,463 B1 | 11/2014 | Medved et al. |
| 9,438,508 B1 | 9/2016 | Medved et al. |
| 9,450,817 B1 | 9/2016 | Bahadur et al. |
| 2003/0103510 A1 | 6/2003 | Svanberg et al. |
| 2005/0169313 A1 | 8/2005 | Okamura et al. |
| 2007/0165515 A1 | 7/2007 | Vasseur |
| 2008/0037562 A1 | 2/2008 | Saleh et al. |
| 2009/0122718 A1 | 5/2009 | Klessig et al. |
| 2009/0232031 A1 | 9/2009 | Vasseur et al. |
| 2009/0238074 A1 | 9/2009 | Vasseur et al. |
| 2011/0044352 A1 | 2/2011 | Chaitou et al. |
| 2011/0047262 A1 | 2/2011 | Martin et al. |
| 2011/0078230 A1 | 3/2011 | Sepulveda |
| 2011/0110226 A1 | 5/2011 | Lu et al. |
| 2011/0110368 A1 | 5/2011 | Matsumoto |
| 2011/0202651 A1 | 8/2011 | Hilt et al. |
| 2012/0092986 A1 | 4/2012 | Chen |
| 2012/0158938 A1 | 6/2012 | Shimonishi et al. |
| 2013/0007266 A1 | 1/2013 | Jocha et al. |
| 2013/0070638 A1 | 3/2013 | Iovanna et al. |
| 2014/0328587 A1 | 11/2014 | Magri et al. |

OTHER PUBLICATIONS

Notice of Allowance from U.S. Appl. No. 14/336,535 dated Feb. 15, 2017, 8 pp.

Alimi et al., "ALTO Protocol," draft-ietf-alto-protocol-06.txt, ALTO WG Internet-Draft, Oct. 25, 2010, 66 pp.

Ash et al., "Path Computation Element (PCE) Communication Protocol Generic Requirements," Network Working Group, RFC 4657, Sep. 2006, 22 pp.

Atlas et al., "Interface to the Routing System Framework," draft-ward-irs-framework-DO, Network Working Group, Internet-Draft, Jul. 30, 2012, 21 pp.

Awduche et al., "RSVP-TE: Extentions to RSVP for LSP Tunnels," Network Working Group, RFC 3209, Dec. 2001, 61 pp.

Bryant et al., "Pseudo Wire Emulation Edge-to-Edge (PWE3) Architecture," Network Working Group, RFC 3985, Mar. 2005, 40 pp.

Bryskin et al., Policy-Enabled Path Computation Framework, Network Working Group, RFC 5394, Dec. 2008, 37 pp.

Chamania et al., "Lessons Learned From Implementing a Path Computation Element (PCE) Emulator," Optical Society of America, Optical Fiber Communication and Exposition, Mar. 6-10, 2011, 3 pp.

Crabbe et al.. "PCEP Extensions for Stateful PCE." Network Working Group Internet Draft, draft-crabbe-pce-stateful-pce-00, Oct. 16, 2011, 40 pp.

Farrel et al., "A Path Computation Element (PCE)-Based Architecture," Network Working Group, RFC 4655, Aug. 2006, 41 pp.

Lee et al., "Path Computation Element Communication Protocol (PCEP) Requirements and Protocol Extensions in Support of Global Concurrent Optimization," Network Working Group, RFC 5557, Jul. 2009, 27 pp.

McKeown et al., "OpenFlow: Enabling Innovation in Campus Networks," Whitepaper from Stanford University, Mar. 14, 2008, 6 pp.

Miyazawa et al., "Traffic Engineering Database Management Information Base in support of MPLS-TE/GMPLS," Network Working Group, Internet Draft, draft-ietf-ccamp-gmpls-ted-mib-09.txt, Jul. 11, 2011, 33 pp.

Oki et al., "Framework for PCE-Based Inter-Layer MPLS and GMPLS Traffic Engineering," Network Working Group, RFC 5623, Sep. 2009, 35 pp.

"OpenFlow Switch Specification, Version 1.1.0 Implemented (Wire Protocol 0x02)," Openflow Consortium, Feb. 28, 2011, found at http://www.openflow.org/documents/openflow-spec-vl.I.O.pdf, 56 pp.

Sahni et al., "Bandwidth Scheduling and Path Computation Algorithms for Connection-Oriented Networks," Sixth International Conference on Networking, Apr. 22-28, 2007, 16 pp.

Seedorf et al., "Application-Layer Traffic Optimization (ALTO) Problem Statement," Network Working Group, RFC 5693, Oct. 2009, 15 pp.

Vasseur et al., "Path Computation Element (PCE) Communication Protocol (PCEP)," Network Working Group, RFC 5440, Mar. 2009, 88 pp.

Prosecution History from U.S. Appl. No. 13/339,983, dated May 15, 2013 through Mar. 18, 2014, 135 pp.

Prosecution History from U.S. Appl. No. 14/336,535, dated Mar. 11, 2015 through Nov. 22, 2016, 99 pp.

Prosecution History from U.S. Appl. No. 13/340,191, dated Jul. 22, 2013 through Jul. 16, 2014, 85 pp.

Prosecution History from U.S. Appl. No. 47/473,766, dated Oct. 23, 2015 through May 9, 2016, 32 pp.

U.S. Appl. No. 13/724,975, by Santosh Kumar Dornal, filed Dec. 21, 2012.

U.S. Appl. No. 14/336,535, by Jan Medved, filed Jul. 21, 2014.

SCHEDULED NETWORK LAYER PROGRAMMING WITHIN A MULTI-TOPOLOGY COMPUTER NETWORK

PRIORITY CLAIM

This application is a continuation of U.S. patent application Ser. No. 14/473,766, filed Aug. 29, 2014, which is a continuation of U.S. patent application Ser. No. 13/340,191, filed Dec. 29, 2011, the entire contents of each of which being incorporated herein by reference.

TECHNICAL FIELD

The invention relates to computer networks and, more specifically, to improving content delivery.

BACKGROUND

Large-scale applications geographically distributed over large areas often process large distributed datasets that require massive data transfer over a wide area network. Service providers configure dedicated bandwidth channels over a network to provide capacity adequate to support the massive data transfer operations.

SUMMARY

In general, techniques are described for dynamically scheduling and establishing paths in a multi-layer, multi-topology network to provide dynamic network resource allocation and support packet flow steering along paths prescribed at any layer or combination of layers of the network. The multi-layer, multi-topology network includes an underlying base network layer having a topology of endpoint nodes connected by physical or logical links as well as one or more overlay networks that each has a topology of endpoint nodes connected by virtual links made up of paths connecting endpoints of the base network layer or a lower-level overlay network.

In one example, a bandwidth calendaring application (BCA) executing on a multi-topology path computation element (PCE) accepts requests from client applications for one or more temporarily dedicated paths between specified endpoints. The PCE receives base network topology and overlay network topology information from network devices, analyzes the various topologies to reconcile requests from multiple client applications, and attempts to identify paths through a layer or combination of layers of the network that can be established at the requested time in view of the specifications requested for the temporarily dedicated paths and the anticipated bandwidth/capacity available in the network.

The PCE schedules the identified paths through the one or more layers of the network to carry traffic for the requested paths. To then establish a requested path, the PCE programs, at the scheduled time, path forwarding information into network nodes at any layer of the multi-layer, multi-topology network that participates in forwarding traffic along the identified path. In this way, the PCE may establish dedicated bandwidth channels, in the form of reserved paths, through the network as well as steer traffic onto the dedicated bandwidth channels to provide connectivity between distributed client applications, for instance.

The techniques may provide one or more advantages. For example, the BCA may have access by operation of the PCE to an enhanced view of the current state of the network at multiple different layers, which may enable the BCA to identify paths that are not visible to a label edge router, for example, having a more limited view. The BCA may additionally, by virtue of having access to this enhanced view, steer traffic to underutilized portions of the network to increase the network capacity utilization. Still further, using the BCA to identify, establish, and in some cases preempt temporarily dedicated paths for reconciling multiple, possibly conflicting application requests may reduce first-in-time, first-in-right access to network resources in favor of explicit, centralized prioritization of application requests for dedicated paths.

In one example, a method comprises receiving, with a multi-topology path computation element, topology information for a base network layer of a multi-topology network that comprises the base network layer having a plurality of network switches interconnected by base network layer three (L3) links in a base network topology and also comprises an overlay network layer having a plurality of overlay switches interconnected by overlay network links in an overlay network topology, wherein each of the overlay network links represents a path through the base network connecting two of the overlay switches. The method also comprises receiving, with the multi-topology path computation element, topology information for the overlay network layer. The method further comprises receiving, with the multi-topology path computation element, a path request that specifies two endpoints. The method also comprises computing, by the multi-topology path computation element, a computed path to carry traffic between the two endpoints through one or more layers of the multi-topology network using the topology information for the base network layer and the topology information for the overlay network layer, wherein at least a portion of the computed path traverses the base network layer, and wherein a first one of the network switches is an ingress network switch for the portion of the computed path. The method further comprises establishing, by the multi-topology path computation element, a communication session with the first network switch. The method also comprises directing, by the multi-topology path computation element using the communication session, the first network switch to establish the portion of the computed path through the base network layer.

In another example, a multi-topology path computation element comprises a multi-topology traffic engineering database to store topology information for a base network layer of a multi-topology network that comprises a plurality of network switches interconnected by base network layer three (L3) links in a base network topology and to store topology information for an overlay network layer of the multi-topology network that comprises a plurality of overlay switches interconnected by overlay network links in an overlay network topology, wherein each of the overlay network links represents a path through the base network connecting two of the overlay switches. The multi-topology path computation element also comprises a topology server interface to receive topology information for the base network layer. The multi-topology path computation element further comprises an overlay controller interface to receive topology information for the overlay network layer. The multi-topology path computation element also comprises a client interface to receive a path request that specifies two endpoints, and a service path engine to compute a computed path to carry traffic between the two endpoints through one or more layers of the multi-topology network using the topology information for the base network layer and the topology information for the overlay network layer, wherein at least a portion of the computed path traverses the base network layer, and wherein a first one of the network switches is an ingress network switch for the portion of the computed path. The multi-topology path computation element further comprises a network switch interface to establish a communication session with the first network switch, wherein the network switch interface directs the first network switch to establish the portion of the computed path through the base network layer.

In another embodiment, a non-transitory computer-readable medium contains instructions. The instructions cause one or more programmable processors to receive, with a multi-topology path computation element, topology information for a base network layer of a multi-topology network that comprises the base network layer having a plurality of network switches interconnected by base network layer three (L3) links in a base network topology and also comprises an overlay network layer having a plurality of overlay switches interconnected by overlay network links in an overlay network topology, wherein each of the overlay network links represents a path through the base network connecting two of the overlay switches. The instructions also cause the processors to receive, with the multi-topology path computation element, topology information for the overlay network layer. The instructions further cause the processors to receive, with the multi-topology path computation element, a path request that specifies two endpoints. The instructions also cause the processors to compute, by the multi-topology path computation element, a computed path to carry traffic between the two endpoints through one or more layers of the multi-topology network using the topology information for the base network layer and the topology information for the overlay network layer, wherein at least a portion of the computed path traverses the base network layer, and wherein a first one of the network switches is an ingress network switch for the portion of the computed path. The instructions further cause the processors to establish, by the multi-topology path computation element, a communication session with the first network switch. The instructions also cause the processors to direct, by the multi-topology path computation element using the communication session, the first network switch to establish the portion of the computed path through the base network layer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
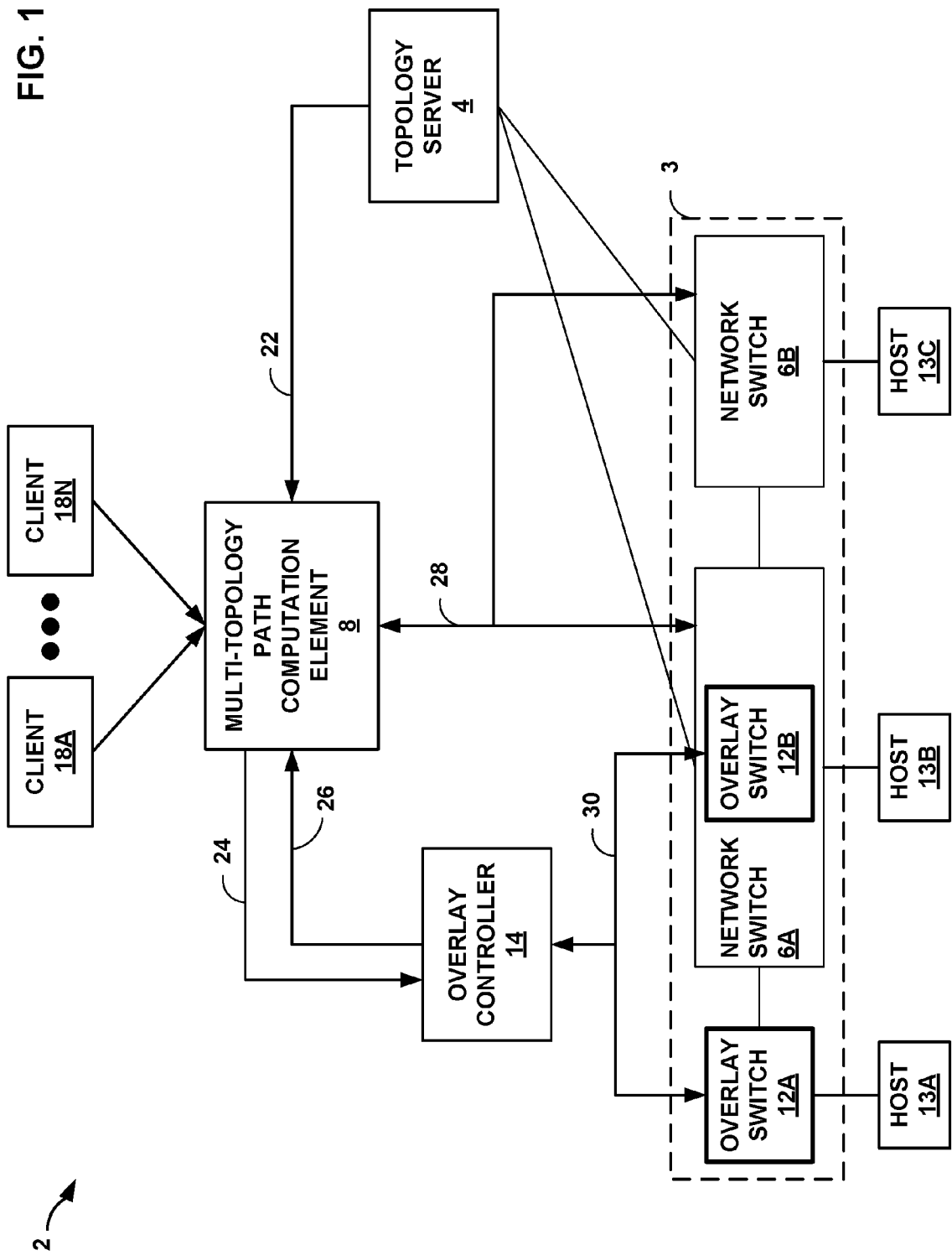
FIG. 1 is a block diagram illustrating an example network system for accepting path requests, computing and scheduling paths that satisfy the path requests, and establishing requested paths through a multi-layer, multi-topology network in accordance with techniques described herein.

FIG. 1 is a block diagram illustrating an example network system for accepting path requests, computing and scheduling paths that satisfy the path requests, and establishing requested paths through a multi-layer, multi-topology network in accordance with techniques described herein. Network system 2 includes a multi-topology network 3 (hereinafter, "network 3") that includes multiple layers that transport traffic between hosts 13A-13C (collectively, "hosts 13"). Hosts 13 may execute a distributed application that requires massive data transfer over network 3 at different times in a dynamic application processing environment. Each of hosts 13 may represent a data server or application processing node, for example.

A base network layer of network 3 (or "base network") includes network switches 6A-6B (collectively, "network switches 6") connected to hosts 13B, 13C and arranged in a physical topology. Network switches 6 receive and forward packet data units (PDUs) for network flows according to forwarding information programmed into the switches by an administrator or external entity (e.g., overlay controller 14 or multi-topology path computation element 8) and/or according to forwarding information learned by the switches, whether by operation of one or more protocols (e.g., interior gateway protocols (IGPs)) or by recording information learned during PDU forwarding. Each of network switches 6 may represent a router, a layer three ("L3") switch, a layer three ("L2") switch, an L2/L3 switch, or another network device that switches traffic according to forwarding information. Accordingly, PDUs forwarded by network switches 6A may include, for example, L3 network packets (e.g., Internet Protocol) packets and/or L2 packets (e.g., Ethernet datagrams or Asynchronous Transfer Mode (ATM) cells). PDUs may be unicast, multicast, anycast, and/or broadcast.

An overlay network layer of network 3 includes overlay switches 12A-12B (collectively, "overlay switches 12") arranged in a virtual topology "over" a physical topology defined by network switches 6. Individual links of the virtual topology of the overlay network (or "overlay links") may be established paths through the base network and/or physical links connecting overlay switches 12. The overlay network may represent a virtual private network (VPN), an OpenFlow network consisting of one or more OpenFlow switches, or an application-layer network with selection functionality built-in to endpoint devices, for example. Accordingly, each of overlay switches 12 may represent a router or routing instance (e.g., a virtual routing and forwarding (VRF) instance); a Virtual Private Local Area Network (LAN) Service (VPLS) instance; a dedicated L2, L3, or L2/L3 switch; or a virtual or "soft" switch (e.g., an OpenFlow switch) implemented by a router or by a dedicated switch, for example. Overlay switch 12A, for instance, represents a dedicated overlay switch. Overlay switch 12B is implemented by network switch 6A and may represent, for instance, a soft switch. Network 3 may include multiple overlay network layers of different or similar types (e.g., multiple VPNs and/or OpenFlow networks).

Topology server 4 receives topology information from network switches 6 for the base network of multi-topology network 3. For example, topology server 4 may execute one or more IGPs or Exterior Gateway Protocols (e.g., the Border Gateway Protocol (BGP)) to listen to routing protocol advertisements sent by network switches 6. Topology server 4 collects and stores the base network topology information, then provides the base network topology information to multi-topology path computation element (PCE) 8 in base topology update messages 22. Topology information may include traffic engineering information for the network links, such as the links' administrative attributes and bandwidth at various priority levels available for use by label-switched paths (LSPs). In some examples, network switches 6 may send topology update messages to topology server 4 that specify L2 link information for L2 links connecting the network switches. In some examples, topology server 4 is a component of PCE 8.

Overlay controller 14 receives topology information for the overlay network of multi-topology network 3 in topology update messages sent by overlay switches 12 in respective communication sessions 30. Topology update messages sent by overlay switches 12 may include virtual and physical switch port information, PDUs and associated metadata specifying respective ports and/or interfaces on which PDUs are received. In some examples, overlay controller 14 is a routing protocol listener that executes one or more routing protocols to receive routing protocol advertisements sent by overlay switches 12. Such routing protocol advertisements may be associated with one or more VRFs, for instance. Overlay controller 14 collects and stores the overlay topology information, then provides the overlay topology information to PCE 8 in overlay topology update messages 26. In some examples, overlay controller 14 is a component of PCE 8.

Network switches 6 may be configured to or otherwise directed to establish paths through the base network of multi-topology network 3. Such paths may include, for instance, IP tunnels such as Generic Route Encapsulation (GRE) tunnels, General Packet Radio Service (GPRS) Tunneling Protocol (GTP) tunnels, LSPs, or a simple route through the base network or a VPN (identified by a static route with a route target, for instance). Network switches 6 provide path status information for paths established through the base network of multi-topology network to PCE 8 in communication sessions 28. Path status (alternatively, "path state" or "LSP state") information may include descriptors for existing, operational paths as well as indications that an established path or path setup operation has failed. For example, network switch 6A may attempt establish an LSP using a reservation protocol such as Resource reSerVation Protocol (RSVP) but fail due to insufficient network resources along a path specified by an Explicit Route Object (ERO). As a result, network switch 6A may provide an indication that the path setup operation failed to PCE 8 in a communication session 28. PCE 8 receives path status information and adds established paths through the base network of network 3 as links in the overlay network topology.

PCE 8 presents an interface by which clients 18A-18N (collectively, "clients 18") may request, for a specified time, a dedicated path between any combination of hosts 13. For example, client 18A may request a 100 MB/s path from host 13A to host 13B from 1 PM to 3 PM on a particular date. As another example, client 18N may request a 50 MB/s path from host 13A to host 13C from 2 PM to 3 PM on the same date. As a still further example, client 18A may request a mesh (or "multipath") of 50 MB/s paths connecting each of hosts 13 to one another from 4 PM to 6 PM on a particular date. The requested mesh is a multipoint-to-multipoint path consisting of multiple point-to-point paths. In addition to the bandwidth, hosts, and time path parameters exemplified above, clients 18 may request paths that conform to other quality of service (QoS) path request parameters, such as latency and jitter, and may further specify additional associated classifiers to identify a flow between the specified endpoints. Example flow classifiers (or "parameters") are provided below.

PCE 8 uses base network topology information for network 3 received from topology server 4, overlay network topology information for network 3 received from overlay controller 14, and path status information received from network switches 6 to compute and schedule paths between hosts 13 through network 3 that satisfy the parameters for the paths requested by clients 18. PCE 8 may receive multiple path requests from clients 18 that overlap in time. PCE 8 reconciles these requests by scheduling corresponding paths for the path requests that traverse different parts of network 3 and increase capacity utilization, for example, or by denying some of the path requests.

At the scheduled time for a scheduled path, PCE 8 installs forwarding information to network 3 nodes (e.g., overlay switches 12 and network switches 6) to cause the nodes to forward traffic in a manner that satisfies the requested path parameters. In some examples, PCE 8 stores all path requests and then attempts to compute and establish paths at respective requested times. In some examples, PCE 8 receives path requests and schedules respective, satisfactory paths in advance of the requested times. PCE 8, in such examples, stores the scheduled paths and uses resources allocated (in advance) for the scheduled paths as a constraint when attempting to compute and schedule later requested paths. For example, where a scheduled path will consume all available bandwidth on a particular link at a particular time, PCE 8 may later compute a requested path at an overlapping time such that the later requested path does not include the completely subscribed link.

A requested path may traverse either or both domains of network 3. That is, a requested path may traverse either or both of the base network and overlay network of multi-topology network 3. For example, because both host 13B and host 13C couple in the base network domain to one of network switches 6, a requested path for traffic from host 13B to host 13C may traverse only the base network domain as a simple network route, for instance, from network switch 6A to network switch 6B. Host 13A, however, couples in the overlay network domain to overlay switch 12A. As a result, any requested path for traffic between host 13A and host 13C, for example, first traverses the overlay network domain and then traverses the base network domain.

PCE 8 installs forwarding information to overlay switches 12 using overlay controller 14. Overlay controller 14 presents a programming interface by which PCE 8 may add, delete, and modify forwarding information in overlay switches 12. Forwarding information of overlay switches 12 may include a flow table having one or more entries that specify field values for matching PDU properties and a set of forwarding actions to apply to matching PDUs. A set of one or more PDUs that match a particular flow entries represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

PCE 8 invokes the programming interface of overlay controller 14 by sending overlay network path setup messages 24 directing overlay controller 14 to establish paths in the overlay network of network 3 and/or steer flows from hosts 13 onto established paths. Overlay controller 14 responds to overlay network path setup messages 24 by installing, to overlay switches 12 using communication sessions 30, forwarding information that implements the paths and/or directs flows received from hosts 13 onto established paths.

PCE 8 installs forwarding information to network switches 6 using communication sessions 28. Each of network switches 6 may present a programming interface in the form of a management interface, configuration interface, and/or a path computation client (PCC). PCE 8 may invoke the programming interface of network switches 6 to configure a tunnel (e.g., an LSP), install static routes, configure a VPLS instance, configure an Integrated Routing and Bridging (IRB) interface, and to otherwise configure network switches 6 to forward packet flows in a specified manner. In some instances, PCE 8 directs one or more of networks switches 6 to signal a traffic engineered LSP (TE LSP) through the base network of network 3 to establish a path. In this way, PCE 8 may program a scheduled path through network 3 by invoking a programming interface of only the head network device for the path.

At the end of a scheduled time for a requested path, PCE 8 may again invoke the programming interfaces of network switches 6 and overlay switches 12 to remove forwarding information implementing the requested paths. In this way, PCE 8 frees resources for future scheduled paths.

Because PCE 8 has an enhanced view of the current state of the network 3 at both the overlay network layer and base network 3, PCE 8 may identify paths that are not visible to any one of network switches 6 or overlay switches 12 having a more limited view. PCE 8 may additionally, by virtue of having access to this enhanced view, steer traffic to under-utilized portions of network 3 to increase capacity utilization of network 3. In addition, centralizing the path computation and establishment with PCE 8 may allow network operators to reconcile multiple, possibly conflicting application path requests and may reduce first-in-time, first-in-right access to network resources in favor of explicit, centralized prioritization of application requests for dedicated paths.

Figure 2:
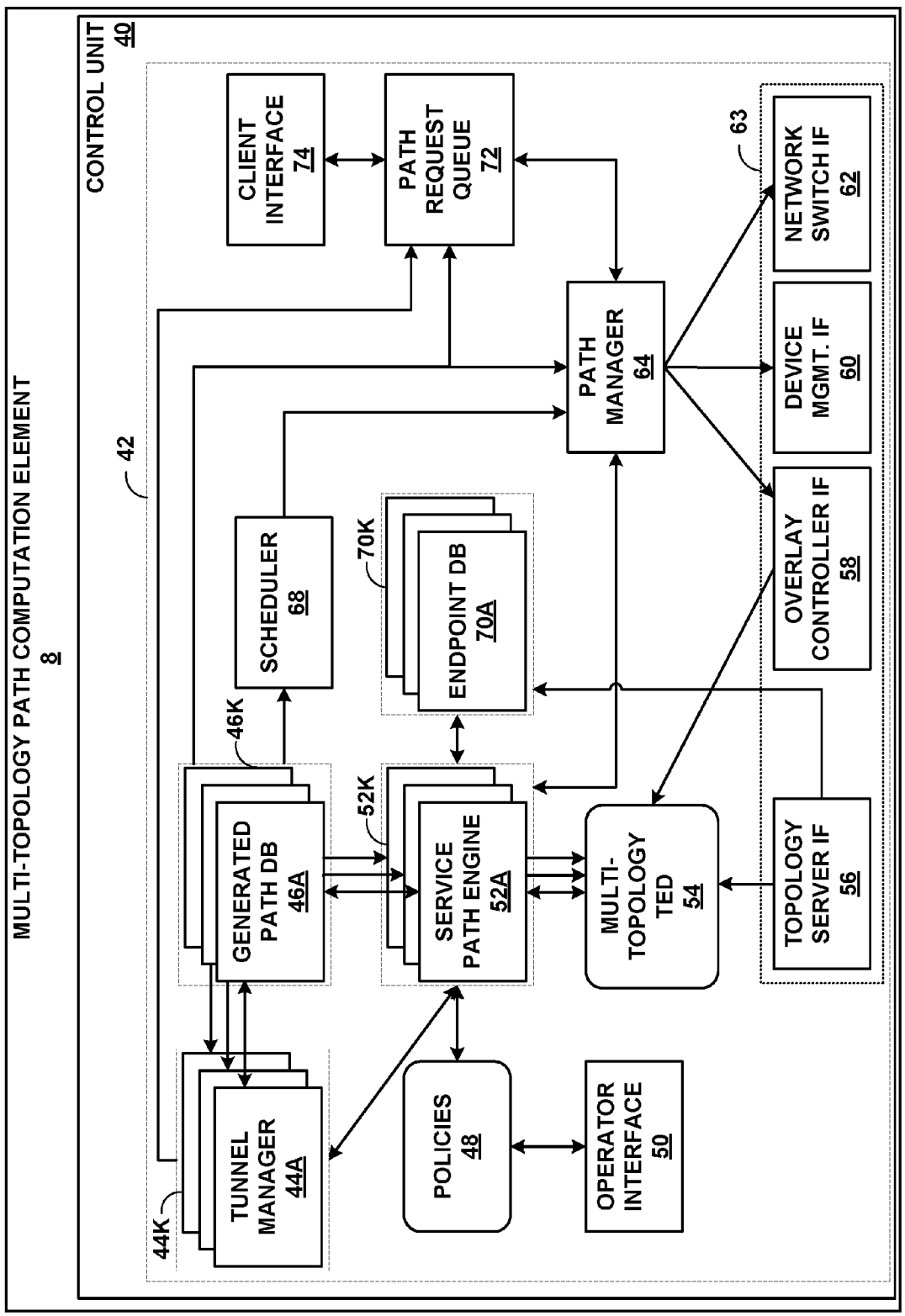
FIG. 2 is a block diagram illustrating an example multi-topology path computation element that receives path requests, computes and schedules paths that satisfy the path requests, and establishes requested paths through a multi-layer, multi-topology network in accordance with techniques described herein.

FIG. 2 is a block diagram illustrating an example multi-topology path computation element that receives path requests, computes and schedules paths that satisfy the path requests, and establishes requested paths through a multi-layer, multi-topology network in accordance with techniques described herein. Multi-topology path computation element 8 may include a server or network controller, for example, and may represent an embodiment of PCE 8 of FIG. 1.

PCE 8 includes a control unit 40 and a network interface (not shown) to exchange packets with other network devices. Control unit may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 40 provides an operating environment for bandwidth calendaring application (BCA) 42. In one example, BCA 42 is a Java application executing on a virtual machine executed by PCE 8. However, BCA 42 may be implemented using any suitable programming language that produces instructions executable by a suitable platform. Furthermore, while illustrated and described executing on a path computation element 8, aspects of BCA 42 may be delegated to other computing devices.

Bandwidth calendaring application 42 accepts requests from client applications to schedule point-to-point and multipoint-to-multipoint paths (multipaths) between different endpoints. Reference herein to a path encompasses multipaths. Paths may be scheduled at different times and dates, with BCA 42 reconciling path requests from multiple client applications to schedule requested paths through a network based on requested path parameters and anticipated network resource availability.

Clients request paths through a network using client interface 74 of BCA 42. In general, a path request includes a requested date/time, a required bandwidth or other constraint, and at least two endpoints. Client interface 74 may be a command line interface (CLI) or graphical user interface (GUI), for instance. Client 74 may also, or alternatively, provide an application programming interface (API), such as a web service. A user uses a client application to invoke client interface 74 to input path request parameters and submit the request to BCA 42. Client interface 74 receives path requests from clients and pushes the path requests to path request queue 72, a data structure that stores path requests for computation distribution by path manager 64.

To compute and schedule paths through a network intelligently, BCA 42 receives topology information describing available resources at multiple layers of the network. Topology server interface 56 (illustrated as "topology server IF 56") communicates with a topology server to receive topology information for a base network layer of the network, while overlay controller interface 58 communicates with an overlay controller to receive topology information for an overlay network layer of the network. Topology server interface 56 may include a routing protocol daemon that executes a routing protocol to receive routing protocol advertisements, such as Open Shortest Path First (OSPF) or Intermediate System-to-Intermediate System (IS-IS) link state advertisements (LSAs) or BGP UPDATE messages. Topology server interface 56 may in some instances be a passive listener that neither forwards nor originates routing protocol advertisements.

In this example, topology server interface 56 receives topology information that includes traffic engineering (TE) information. Topology server interface 56 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the domain. In some instances, topology server interface 56 executes Border Gateway Protocol to receive advertised TE information for inter-AS and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Topology server interface 56 may in some instances receive a digest of topology information collected by a topology server, rather than executing a routing protocol to receive routing protocol advertisements directly. Topology server interface 56 stores base network topology information with TE information in multi-topology traffic engineering database 54 (illustrated as "multi-topology TED 54," hereinafter "MT TED 54"), which is stored by a computer-readable storage medium of control unit 40 for use in path computation. MT TED 54 is described in further detail below.

Overlay controller interface 58 (illustrated as "overlay controller IF 56") receives topology information from an overlay controller that describes overlay network links connecting overlay switches. In general, overlay network links are not advertised by network switches (e.g., routers) of the base network for the overlay network and so will not be described by topology information received by topology server interface 56. An overlay controller augments the base network topology with overlay network topology links by providing overlay network topology information to overlay controller interface 58, which stores the overlay network topology information to MT TED 54. Overlay controller interface 58 may receive topology information for multiple different overlay networks, including VPNs and/or OpenFlow networks. Different overlay networks may require different instances of overlay controller interface 58 that communicate with network switches of the overlay network or with a topology server, for example, to receive overlay network topology information for respective overlay networks.

Multi-topology traffic engineering database 54 stores topology information for a base network layer and one or more overlay network layers of a network that constitutes a path computation domain for PCE 8. MT TED 54 may organize topology information for respective network layers hierarchically, with the base network topology information supporting the topology information for one or more overlay networks. Paths in a lower-layer topology may appear as links in a higher-layer topology. For example, tunnels (e.g., TE LSPs) created in the base network layer can appears as links in an overlay network TE topology. BCA 42 may then correlate overlay network links with paths established in the base network layer to efficiently compute paths that cross multiple overlay topologies. MT TED 54 may include one or more link-state databases (LSDBs), where link and node data is received in routing protocol advertisements, received from a topology server, and/or discovered by link-layer entities such as an overlay controller and then provided to BCA 42 via overlay controller interface 58. In some instances, an operator may configure traffic engineering or other topology information within MT TED 54 via operator interface 50.

Topology server interface 56 may also receive, from a topology server or by execution of routing protocols to receive routing protocol advertisements that include reachability information, endpoint information that describes endpoints reachable by specified nodes in any of the network topologies. Topology server interface 56 may receive endpoint information for a base layer of the network as well as for one or more services (e.g., VPNs) provided by the network that may correspond to overlay networks of the network. Endpoint information may associate network address prefixes with a nodes of the multi-topology network layers, where network address prefixes may be, e.g., IPv4 or IPv6. For example, topology server interface 56 may receive a BGP UPDATE message advertising a particular subnet as reachable from a particular node of the base network. As another example, topology server interface 56 may receive an Application-Layer Traffic Optimization map that includes PIDs associating respective nodes of a multi-topology network layer with network address prefixes reachable from the nodes. Endpoints that have network addresses that are members of the subnet are therefore reachable from the node, and BCA 42 may calculate paths for those endpoints to terminate (i.e., begin or end) at the node. Topology server interface 56 stores endpoint information received for a layer to a corresponding one of endpoint databases 70A-70K (illustrated as "endpoint DB 70A-70K" and collectively referred to as "endpoint databases 70"), where K refers to a number of layers of the multi-topology network that constitutes a path computation domain for PCE 8. Some of endpoint databases 70 may therefore be associated with respective service instances, e.g., respective VPNs that constitute overlay network layers of a multi-topology network. BCA 42 may therefore use endpoint databases 70 to locate and validate endpoints specified in path requests received from clients.

Each of service path engines 52A-52K (collectively, "SPEs 52") compute requested paths through a layer of the multi-topology network with which it is associated and for which it is responsible. Control unit 40 may execute multiple SPEs 52 concurrently, e.g., as separate processes. Each of SPEs 52 is associated with a corresponding one of generated path databases 46A-46K (illustrated as "generated path DB 46A-46K" and collectively referred to as "generated path databases 46"). Path manager 64 dequeues path requests from path request queue 72 and assigns path requests to SPEs 52 based on the layer of the multi-topology network in which the endpoints reside, as determined by path manager 64 from endpoint databases 70. That is, endpoints reachable by layers of a multi-topology network that is a path computation domain for PCE 8 are stored by at least one of endpoint databases 70, and path manager 64 determines the one or more endpoint databases 70 that include endpoints specified for a dequeued path request.

Paths are unidirectional. If a client requests a bidirectional path, path manager 64 triggers two path requests for the requested path—one for each direction. In some cases, a path may cross multiple layers of the network, e.g., at a gateway to the base layer that is implemented by one of the overlay network nodes or at a network node that participates in multiple overlay networks. In such cases, multiple SPEs 52 may cooperate to compute segments of the multi-layer path that path manager 64 stitches together at the gateway. Upon computing paths, SPEs 52 schedule the paths by storing the paths to respective generated path databases 46. A scheduled path stored in one of generated path databases 46 includes path information used by path manager 64 to establish the path in the network and may include scheduling information used by scheduler 68 to trigger path manager to establish the path. As described in further detail below, path scheduling may require locking generated path databases 46 to perform path validation prior to committing the path.

When a servicing path request received from path manager 64, an SPE 52 may initially validate the request by determining from endpoint databases 70 that the endpoints for the requested path, whether expressed as logical interfaces or network addresses, are known to PCE 8, i.e., exist within the path computation domain of PCE 8. The SPE 52 may additionally validate flow classifiers to ensure that the flow classifiers specified for a requested path exist. If initial validation fails for either/both of these reasons, the SPE 52 rejects the requested path and path manager 64 sends a path rejection message detailing the reasons to the requesting client via client interface 74.

To compute a requested path at a layer of a multi-topology network, a service path engine 52 for the layer uses MT TED 54 and the corresponding one of generated path databases 46 for the layer to determine whether there exists a path in the layer that satisfies the TE specifications for the requested path for the duration of the requested time. SPEs 52 may use the Djikstra constrained SPF (CSPF) and/or the Bhandari Edge disjoint shortest pair (for determining disjointed main and backup paths) path computation algorithms for identifying satisfactory paths though the multi-topology network. If a satisfactory computed path for the requested path exists, the computing service path engine 52 for the layer re-validates the computed path and, if validation is successful, schedules the computed path by adding the computed path to the one of generated path databases 46 for the layer. In addition, the computing SPE 52 adds the requested path start/complete times to scheduler 68. A computed path added to one of generated path databases 46 is referred to as a "scheduled" path, until such time as path manager 64 programs the scheduled path into the multi-topology network, whereupon the scheduled path becomes an "active" path. A scheduled or active path is a temporarily dedicated bandwidth channel for the scheduled time in which the path is, or is to become, operational to transport flows.

As noted above, generated path databases 46 store path information for scheduled and active paths. Path information may include an ERO that specifies a list of overlay or base network nodes for a TE LSP, routes or tunnels to be configured in one or more overlay network or base network nodes, forwarding information for overlay network nodes specifying respective sets of forwarding actions to apply to PDUs inbound to the overlay network nodes, and/or any other information usable by any of topology node interfaces 63 to establish and steer flows onto scheduled paths in a multi-topology network.

SPEs 52 compute scheduled paths based upon a current state (or "snapshot") of the multi-topology network, as represented by MT TED 54 and generated path databases 46. Because multiple SPEs 52 execute simultaneously, in this example, to compute and schedule paths through the multi-topology network, multiple SPEs 52 may attempt to update generated path databases 46 simultaneously, which could in some cases result in network resource oversubscription and failure by PCE 8 to satisfy requested paths. An SPE 52 may therefore, having computed a path, execute a transaction that conforms to the ACID properties (atomicity, consistency, isolation, durability) or another type of atomic transaction to both re-validate and update generated path databases 46 with a scheduled path. That is, the SPE 52 may first lock generated path databases 46 to prevent other SPEs 52 from modifying generated path databases 46. The SPE 52 may then validate the computed path against the locked generated path databases 46 as well as MT TED 54. If the computed path is valid, the SPE 52 updates generated path databases 46 by adding the computed path as a scheduled path. The SPE 52 then unlocks generated path databases 46. In this way, all affected links are updated in the same transaction, and subsequent path validations by other SPEs 52 account for the updates. SPEs 52 may use any suitable data structure locking mechanism, such as monitors, mutexes, or semaphores, to lock generated path databases 46.

If the SPE 52 fails to validate a previously computed path, the SPE 52 attempts to recompute the path. Upon identifying a satisfactory path against the current snapshot of the multi-topology network, the SPE 52 again attempts to validate the computed path and update generated path databases 46.

In some cases, SPEs 52 may be unable to identify a path through an overlay network with which to satisfy a path request. This failure may be due to any of a number of factors. For example, sufficient network resources with which to satisfy the path request may be unavailable for the scheduled time due, for instance, to previously scheduled paths that include one or more links of the base network layer for any possible paths between the endpoints of the path request at an overlapping time. In this example, path computation fails. In other words, one or more paths between the endpoints of the path request exist, but the paths are already sufficiently subscribed to prevent the additional reservation of adequate resources for the requested path. As another example, SPEs 52 may be unable to identify any paths through an overlay network between the endpoints of the path request because the computation failed due to a missing link in the overlay network. In other words, the computed overlay network graph, after removing unusable edges unable to satisfy path request constraints, includes two disjoint subgraphs of the overlay network. However, in this case, a suitable path may be generated by creating a tunnel through the base layer between the subgraphs for the overlay network.

Where path computation fails because sufficient network resources do not exist at the requested time, the computing SPE 52 may consider policies 48, set by an operator via operator interface 50, that establish priorities among clients of PCE 8 and/or among path request parameters, including bandwidth, hosts, time, and QoS parameters as well as flow classifiers. A policy of policies 48 may prioritize the requested path for which path computation failed over and against one or more scheduled paths of generated path databases 46. In such instances, the computing SPE 52 may preempt one or more of these scheduled paths by removing (again, in accordance with policies 48) the paths from generated path databases 46 and scheduler 68. In addition, the computing SPE 52 in such instances enqueues the removed paths as path requests to path request queue 72. Components of PCE 8 may then again attempt to compute satisfactory paths for the path requests corresponding to paths removed from generated path databases 46. Where SPEs 52 are unable to identify a satisfactory path for such a path request, SPEs 52 direct path manager 64 to send a path rejection message to a requesting client that issued the path request via client interface 74. In effect, PCE 8 revokes a grant of scheduled multi-topology network resources made to the requesting client.

Where path computation fails due to a missing link between disjoint subgraphs of an overlay network each providing reachability to respective endpoints for a requested path, the computing SPE 52 requests one of tunnel managers 44A-44K (collectively, "tunnel managers 44") to establish a tunnel in a lower layer of the multi-topology network. For example, one of SPEs 52 for an overlay network may request a tunnel in a lower layer overlay network or in the base network layer. Each of tunnel managers 44 is associated with one of the layers of the multi-topology network and with one of generated path databases 46. In other words, each of tunnel managers 44 manages tunnels for one of the topologies.

Tunnel managers 44 operate as intermediaries between generated path databases 46 and SPEs 52. A higher layer SPE of SPEs 52 may request a lower layer one of tunnel managers 44 to establish a tunnel between two nodes of the lower layer to create a link in the higher layer. Because a tunnel traverses two layers of the multi-topology network, each of the two nodes may straddle the two layers by having an ingress and egress interface coupling the two layers. That is, a first one of the two nodes may be an ingress network switch having an ingress interface to the base network layer, while a second one of the two nodes may be an egress network switch having an egress interface from the base network layer. The tunnel manager 44, in response, may enqueue a path request specifying the two nodes in the lower layer of the multi-topology network to path request queue 72. If a lower layer SPE 52 is able to schedule a path for the path request, this path becomes a link in the lower layer generated path database 46, and the lower layer SPE 52 notifies the requesting one of tunnel managers 44 with link tunnel information for the link. The tunnel manager 44 propagates this tunnel information to MT TED 54, which triggers the higher layer SPE 52 that a new link is available in the higher layer topology and prompts the higher layer SPE to reattempt computing a satisfactory path for the original requested path. Tunnel managers 44 may also validate tunnel setup at their respective layer of a multi-topology network.

Scheduler 68 instigates path setup by tracking scheduled start times for scheduled paths in generated path databases 46 and triggering path manager 64 to establish the scheduled paths at their respective start times. Path manager 64 establishes each scheduled path using one or more of topology node interfaces 63 including overlay controller interface 58, device management interface 60, and network switch interface 62. Different instances of PCE 8 may have different combinations of topology node interfaces 63.

Path manager 64 may invoke the overlay controller interface 14 to sending overlay network path setup messages, e.g., overlay network path setup messages 24 of FIG. 1, directing an overlay controller to establish paths in an overlay network and/or steer flows from hosts onto established paths in accordance with path information for scheduled paths in generated path databases 46. In this way, BCA 42 may program paths according to a permanent virtual circuit (PVC) (or "hop-by-hop") model by programming forwarding state in network and/or overlay switches to execute the paths being programmed.

Device management interface 60 may represent a Simple Network Management Protocol (SNMP) interface, a Device Management Interface (DMI), a CLI, or any other network device configuration interface. Path manager 64 may invoke device management interface 60 to configure network switches (e.g., routers) with static routes, TE LSPs, or other tunnels in accordance with path information for scheduled paths in generated path databases 46. Network switch interface 62 establishes communication sessions, such as communication sessions 28 of FIG. 1, with network switches to receive and install path state information and to receive path setup event information. Network switch interface 62 may be a PCE protocol (PCEP) interface, a DMI, or SNMP interface, for example.

Path manager 64 may invoke device management interface 60 and/or network switch interface 62 to configure and direct network switches to establish paths in a base network layer or overlay network layer of a multi-topology network. For example, path manager 64 may first configure a TE LSP within a network switch at a network edge, then direct the network switch to signal a path for the TE LSP using RSVP with traffic engineering extensions (RSVP-TE) or another signaling protocol. In this way, BCA 42 may program paths, including TE LSPs, into the network according to a soft PVC (SPVC) model. In this model, the network presents a programming interface that BCA 42 invokes to dynamically set up the SPVCs. In some examples, BCA 42 may use a combination of PVC and SPVC models to program paths into a multi-topology network.

Upon receiving confirmation from topology node interfaces 63 that a scheduled path setup is successful, path manager 64 transitions a status of the scheduled path in generated path databases 46 to "active." At the scheduled end time (if any) for an active path, scheduler 68 notifies path manager 64 to tear down the active path using topology node interfaces 63. After tearing down the path, path manager 64 removes the path from generated paths 46.

Figure 3:
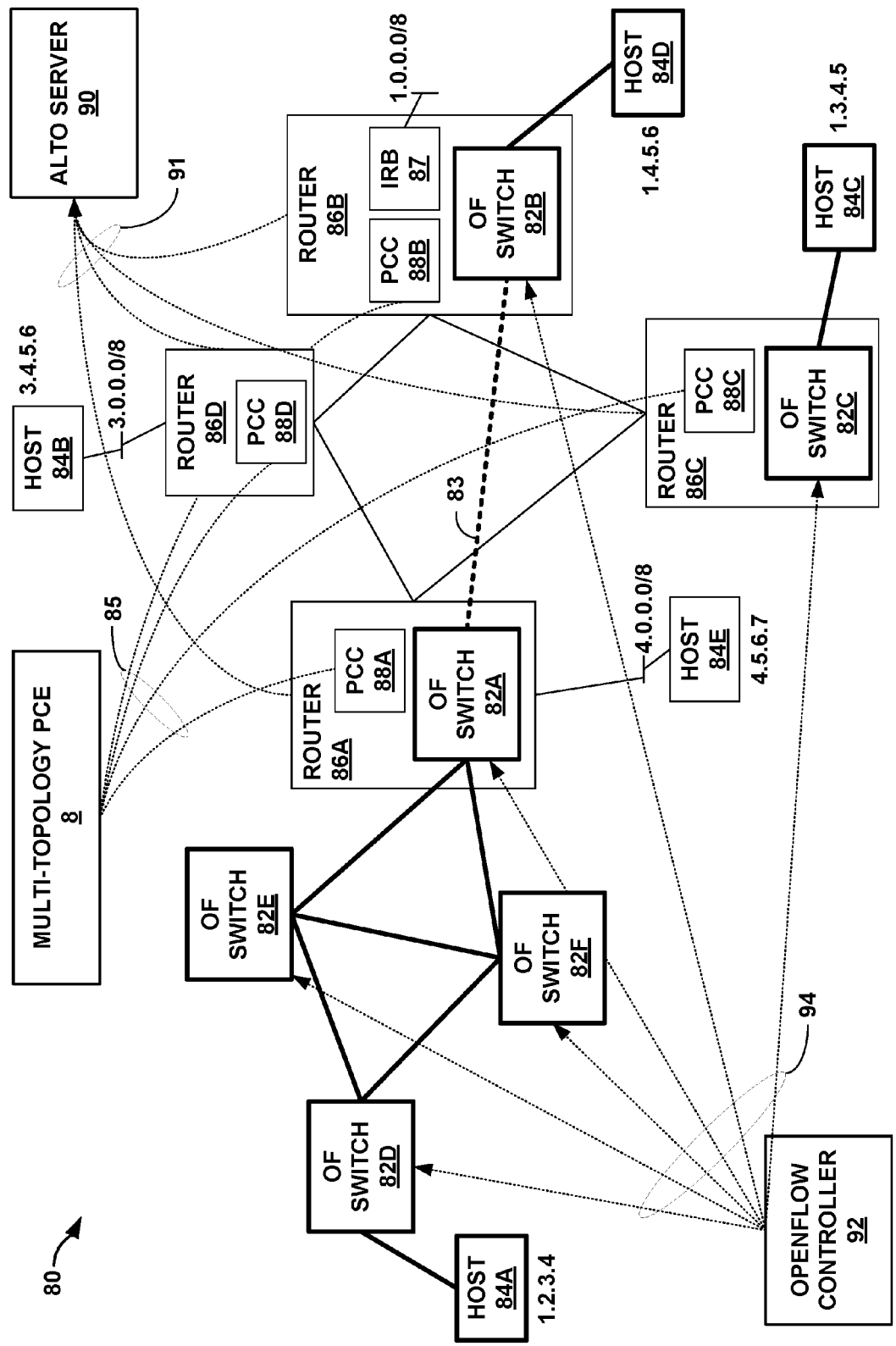
FIG. 3 is a block diagram of an example multi-topology network in which a multi-topology path computation element programs requested paths according to techniques of this disclosure.

FIG. 3 is a block diagram of an example multi-topology network in which a multi-topology path computation element programs requested paths according to techniques of this disclosure. Multi-topology network 80 may represent an example of network 2 of FIG. 1.

A base network layer of multi-topology network 80 includes routers 86A-86D (collectively, "routers 86") connected in the illustrated topology by network links. Base network layer routers 86 and interconnecting network links are illustrated in FIG. 3 with a thin line weight in comparison to nodes and interconnecting communication links of the overlay network layer of multi-topology network 80. Each of routers 86 may represent an example of any of network switches 6A-6B of FIG. 1. Routers 86 execute routing protocols to exchange routes that specify reachability to network subnets that each includes one or more of hosts 84A-84E (collectively, "hosts 84"). Each of hosts 84 may represent an example of any of hosts 13 of FIG. 1. For example, router 86D provides reachability to the 3.0.0.0/8 network subnet, which includes host 84B (having network address 3.4.5.6). As another example, router 86B provides reachability to the 1.0.0.0/8 network subnet, which includes hosts 84A, 84C, and 84D. Routers 86 also exchange topology information by which the routers may determine paths through the base network layer to a router that provides reachability for the network subnets. Network subnets include prefixes that conform to a network addressing scheme of the base network layer. The network addressing scheme in the illustrated example is IPv4. In some examples, the network addressing scheme is IPv6 or another network addressing scheme.

Each of routers 86 may be geographically distributed over a wide area. The base network layer of multi-topology network 80 may include multiple autonomous systems that transport traffic between hosts 84 to migrate data among distributed applications executing on hosts 84, for example.

Path computation clients (PCCs) 88A-88D (collectively, "PCCs 88") of respective routers 86 provide path status information for paths established through the base network of multi-topology network 80 to PCE 8 in respective PCE protocol (PCEP) sessions 85. Path status information may include descriptors for existing, operational paths as well as indications that an established path or path setup operation has failed. For example, PCE 8 may direct router 86A to establish an LSP over a computed path. Router 86A may attempt to signal the LSP using a reservation protocol such as RSVP-TE but fail due to insufficient network resources along a path specified by an Explicit Route Object (ERO). As a result, router 86A may provide an indication that the path setup operation failed to PCE 8 in a PCEP session 85.

PCE 8 may be a stateful PCE that maintains synchronization not only between PCE 8 and multi-topology network 80 base network layer topology and resource information as provided by PCCs 88, but also between PCE 6 and the set of computed paths and reserved resources in use in the network, as provided by PCCs 88 in the form of LSP state information. PCCs 88 may send path setup failure and path failure event messages using LSP state report messages in extended PCEP sessions to provide LSP state information for LSPs configured in any of routers 86. Extensions to PCEP that include LSP state report messages are described more fully in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, which is incorporated herein by reference in its entirety. PCE 8 receives path status information and adds established paths through the base network layer of multi-topology network 80 as links in an overlay network topology stored by PCE 8. The overlay network topology may be stored in an example of MT TED 54 of FIG. 2. Tunnel 83, in this example, may be an instance of an established path computed by PCE 8 and signaled by router 86A to reach router 86B. Tunnel 83 may be a bi-directional tunnel. Tunnel 83 may thereafter be used to exchange L2 traffic between OpenFlow switch 82A and 82B. As a result, tunnel 83 is a link in the overlay topology network and is represented as such in the overlay network topology stored by PCE 8.

Extended PCEP sessions 85 also allow PCE 8 to actively update LSP parameters in PCCs 88 that have delegated control to PCE 8 over one or more LSPs headed by corresponding routers 86. The delegation and control techniques may, for example, allow PCE 8 to trigger LSP re-route, by an LSP head-end router such as any of routers 86, in order to improve LSP placement. In addition, LSP state injection using extended PCEP sessions 85 may further enable to PCE 8 to modify parameters of TE LSPs, including bandwidth and state, to synchronously coordinate demand placement, thereby permitting ordered control of path reservations across network routers.

PCE 8 may also configure new LSPs by configuring any of routers 86 to include new LSP interfaces. For example, PCE 8 may use an example of device management interface 60 of FIG. 1. to configure router 86A to include an LSP represented by tunnel 83. PCE 8 may then use a PCEP session 85 with PCC 88A to direct router 86A to signal the LSP toward router 86B. In this way, PCE 8 may program tunnels for the overlay network layer of multi-topology network 80 between any of routers 86.

The service provider or other administrator for network 80 deploys Application-Layer Traffic Optimization (ALTO) server 90 to provide an application-layer traffic optimization service over network 80. The application-layer traffic optimization service may in some instances conform to the ALTO protocol. In general, the ALTO service enables service and/or content providers to influence the node selection process by applications to further service provider objectives, which may include improving path computation by reducing transmission costs along network layer topology links to the provider, load balancing, service-level discrimination, accounting for bandwidth constraints, decreasing round-trip delay between hosts 84 or between routers 86, and other objectives. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety. Furthermore, while generally described with respect to the ALTO service and ALTO servers as described in Seedorf et al., the techniques of this disclosure are applicable to any form of application-layer traffic optimization.

ALTO server 90 establishes respective peering sessions 91 with routers 86A, 86B, and 86D that are edge routers of the base network layer of multi-topology network 80. Each of peering sessions 91 may comprise an Interior Border Gateway Protocol (IBGP) session or an exterior Border Gateway Protocol (BGP) session, for instance. In this way, ALTO Server 90 receives, in peering sessions 91, topology information for the base network layer originated or forwarded by routing protocol speakers of multi-topology network 80. The received topology information describes the topology of the routers 86 base network layer of network 80 and reachability of network address prefixes by any of routers 86. Peering sessions 91 may comprise Transmission Control Protocol (TCP) sessions between ALTO server 90 and routers 86A, 86B, and 86D. In some instances, ALTO server 90 may establish a single peering session with a route reflector (not shown) that "reflects" topology information to ALTO server 90 that is received by the route reflector from routers 86.

Peering sessions 91 may also, or alternatively, include interior gateway protocol (IGP) sessions between ALTO server 90 and routers 86. ALTO server 90 may operate as a passive IGP listener by peering with routers 86 in peering sessions 91. That is, ALTO server 90 receives routing information from routers 86 in peering sessions 91 but does not originate or forward routing information, for ALTO server 90 does not route packets (in its capacity as an ALTO server). Peering sessions 91 may represent, for example, an OSPF or IS-IS neighbor relationship (or "adjacency") or may simply represent movement of current routing information from routers 86 to ALTO server 90. In some instances, peering sessions 91 include traffic engineering extensions (e.g., OSPF-TE or IS-IS-TE) and routers 86 provide traffic engineering information to ALTO server 90.

ALTO server 90 generates one or more network maps and cost maps for multi-topology network 80 using topology information received in peering sessions 91 and provides these maps to ALTO clients, such as PCE 8. A network map contains network location identifiers, or PIDs, that each represents one or more network devices in a network. In general, a PID may represent a single device or device component, a collection of devices such as a network subnet, or some other grouping. A cost map contains cost entries for pairs of PIDs represented in the network map and an associated value that represents a cost to traverse a network path between the members of the PID pair. The value can be ordinal (i.e., ranked) or numerical (e.g., actual). ALTO server 90 provides the network maps and cost maps to PCE 8, which uses the network maps and cost maps to compute paths through multi-topology network 80.

Figure 5:
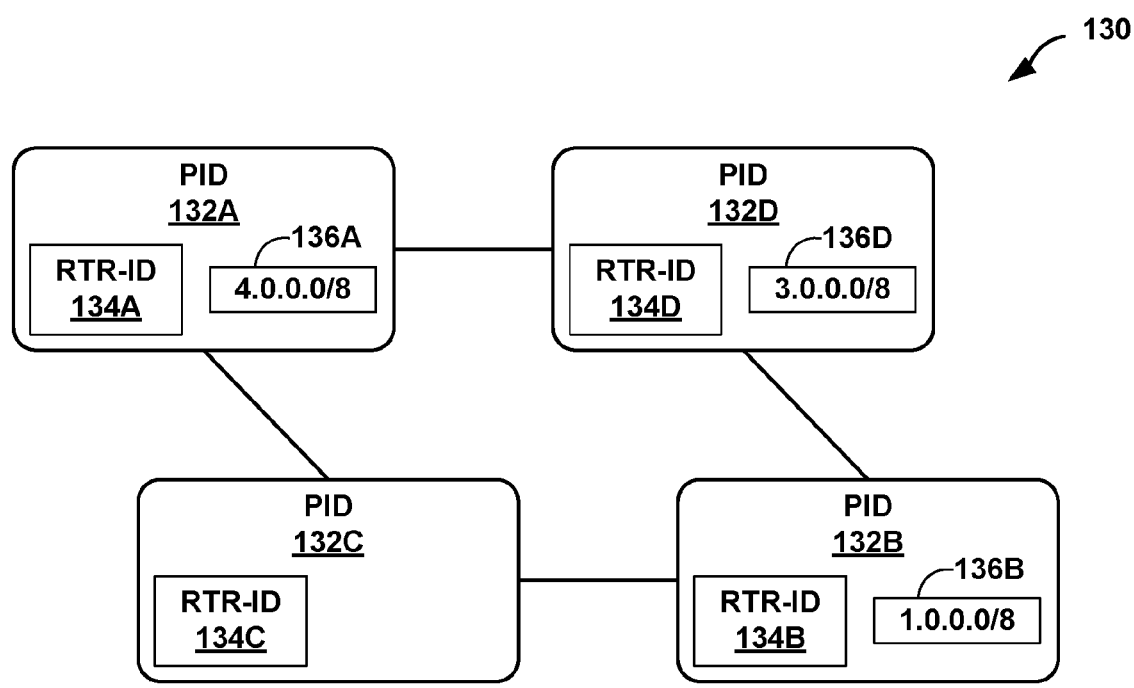
FIG. 5 is a block diagram illustrating an example graph that represents a combined network map and cost map that describes an endpoint database for a multi-topology network generated in accordance with techniques described herein.
Figure 7:
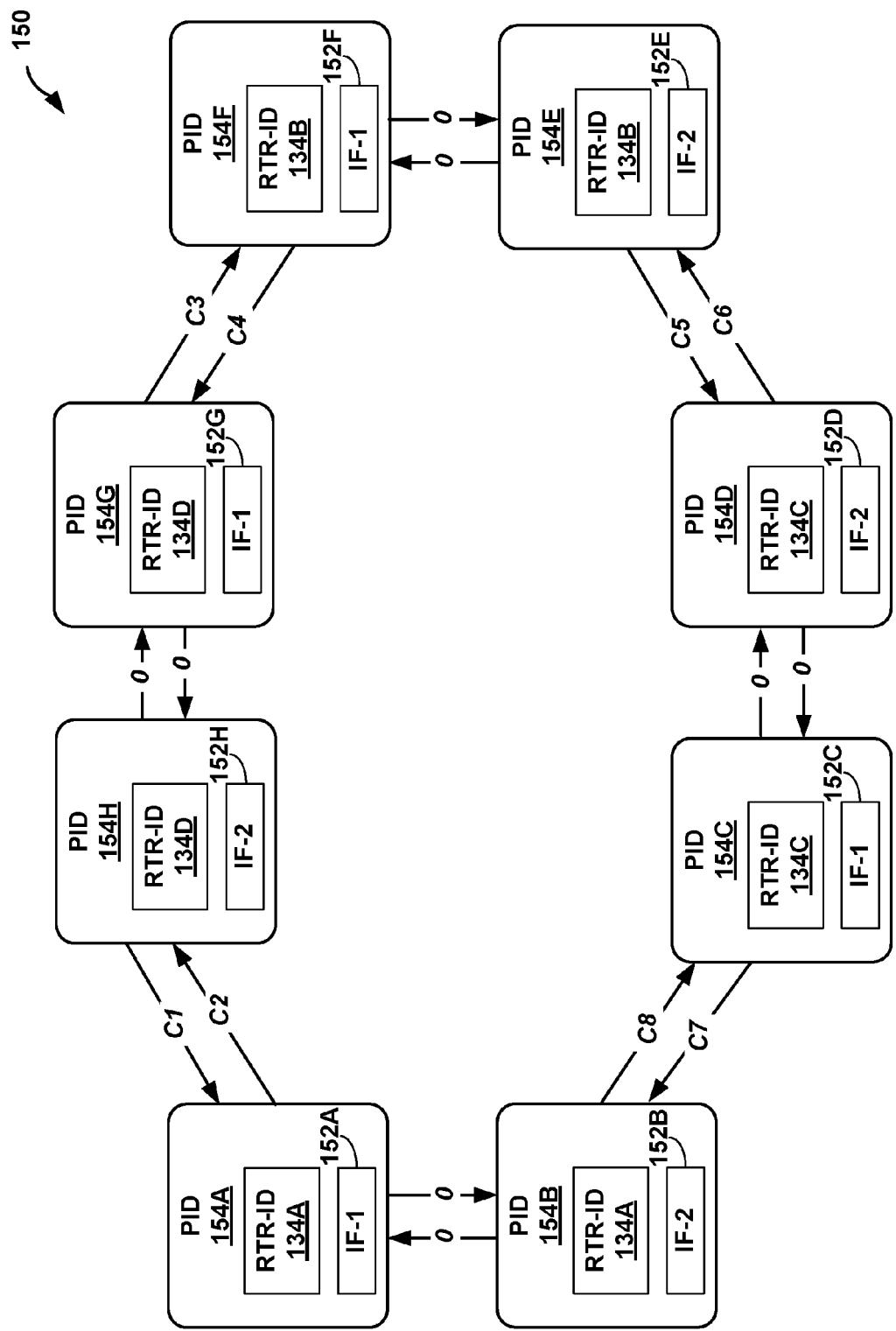
FIG. 7 is a block diagram illustrating an example graph that represents a topology of a base network of a multi-topology network generated in accordance with techniques described herein.

In this example, ALTO server 90 generates at least two views of multi-topology network 80, in the form of network maps and corresponding cost maps, in accordance with techniques of this disclosure: a first view that constitutes an endpoint database for a base network layer (e.g., an example of endpoint databases 70 of FIG. 2) and a second view for the base network layer that describes an L3 traffic engineering database at link-level granularity, where link-level refers to the level of individual interfaces of routers 86. The second view, in other words, provides traffic engineering information for links connecting pairs of interfaces on respective routers 86. FIG. 5 provides an example of the first view generated by ALTO server 90, while FIG. 7 provides an example of the second view.

Further details regarding generating network and cost maps for a network are found in Penno et al., U.S. patent application Ser. No. 12/861,645, entitled "APPLICATION-LAYER TRAFFIC OPTIMIZATION SERVICE SPANNING MULTIPLE NETWORKS," filed Aug. 23, 2010, the entire contents of which are incorporated herein by reference. Additional details regarding ALTO map updates are found in Raghunath et al., U.S. patent application Ser. No. 12/861,681, entitled "APPLICATION-LAYER TRAFFIC OPTIMIZATION SERVICE MAP UPDATES," filed Aug. 23, 2010, the entire contents of which are incorporated herein by reference.

ALTO server 90 may comprise, for example, a high-end server or other service device or a service card or programmable interface card (PIC) insertable into a network device, such as a router or switch. ALTO server 90 may operate as an element of a service plane of a router to provide ALTO services in accordance with the techniques of this disclosure. In some instances, ALTO server 90 is incorporated into PCE 8. ALTO server 90 may represent an example embodiment of topology server 4 of FIG. 1. Additional details regarding providing ALTO services as an element of a service plane of a router are found in Raghunath et al., incorporated above.

Multi-topology network 80 also includes overlay network layer of interconnected OpenFlow (OF) switches 82A-82F (collectively, "OpenFlow switches 82") controlled by OpenFlow controller 92. While the overlay network layer is an L2 network in this example, the overlay network layer may be an L3 network in some instances. Each of OpenFlow switches 82 performs packet lookups and forwarding according to one or more flow tables each having one or more flow entries. Each flow entry specifies one or more match fields and a set of instructions to apply to packets the match values of the match fields. A match field may match any of the PDU parameters described above with respect to FIG. 1 (e.g., source and destination MAC and IP addresses). The set of instructions associated with each flow entry describe PDU forwarding and PDU modifications for PDU flows. For example, a set of instructions may direct one of OpenFlow switches 82 to decrement a time-to-live (TTL) value for PDUs in matching flows and then output the PDUs to a particular outbound interface of the OpenFlow switch. Additional details regarding OpenFlow are found in "OpenFlow Switch Specification version 1.1.0", OpenFlow Consortium, February 2011, which is incorporated by reference herein. While not illustrated as such to simply the figure, PCE 8 may couple to ALTO server 90 and OpenFlow controller 92 to exchange data and control messages using communication links.

OpenFlow switches 82D-82F represent dedicated OpenFlow switches that may each be a standalone device in the form of a router, L3, L2, or L2/L3 switch, or another network device that switches traffic according to forwarding information. As dedicated OpenFlow switches, OpenFlow switches 82D-82F do not in this example share a chassis or other hardware resources with a base network layer device (e.g., any of routers 86). Routers 86A-86C implement corresponding OpenFlow switches 82A-82C to direct traffic on respective subsets of physical or virtual interfaces of the routers. For example, router 86A may implement OpenFlow switch 82A to control a VPLS instance that switches L2 traffic among a set of interfaces that includes interfaces to OpenFlow switches 82B (i.e., a virtual interface for tunnel 83), 82E, and 82F. In this way, OpenFlow switches 82A-82C share hardware resources with corresponding routers 86A-86C.

The overlay network layer includes tunnel 83 connecting OpenFlow switches 82A, 82B. Tunnel 83 is a service link that transports L2 communications between routers 86A, 86B. Tunnel 83 is illustrated in FIG. 3 as a dashed lines to reflect that tunnel 83 may not directly couple routers 86A, 86B to one another, but may be transported over one or more physical links and intermediate network devices that form tunnel 83. Tunnel 83 may be implemented as a pseudowire operating over a TE LSP or GRE tunnel, for example. Pseudowire service emulation is described in additional detail in "Pseudo Wire Emulation Edge-to-Edge (PWE3) Architecture," Request for Comments: 3985, Network Working Group (Bryant and Pate, ed.), March, 2005, which is incorporated by reference as if fully set forth herein.

Router 86B includes an integrated routing and bridging (IRB) interface 87 that is a gateway between the overlay network layer and the base network layer of multi-topology network 80. IRB interface 87 connects the bridge domain that is the L2 overlay network layer of multi-topology network 80 to a routed domain that is the base network layer. IRB interface 87 thus includes both a bridging instance that includes L2 learning tables as well as a routing instance mapped to the bridging instance. The bridging instance may include OpenFlow switch 82B operating over a VPLS or other L2 instance. IRB interface 87 therefore acts as a L3 routing interface for a bridge domain in which OpenFlow switch 82B participates. In this way, IRB interface 87 provides simultaneous support for L2 bridging and L3 routing and can function as a gateway between the layers of multi-topology network 80.

The bridge domain in this example includes subnet 1.0.0.0/8, for which router 86B advertises itself to other routers 86 as providing reachability to. Elements of the overlay network (e.g., hosts 84A, 84C, and 84D) may identify routable L3 traffic by addressing the L3 traffic to a gateway L2 address (e.g., a gateway MAC address) known to IRB interface 87. The gateway L2 address may be a MAC address of router 86B, a MAC address of an interface of router 86B that couples to an overlay network link, or any other L2 address that IRB interface 87 may use to classify PDUs arriving on an L2 interface of router 86B as L3 traffic.

OpenFlow controller 92 establishes OpenFlow protocol sessions 94 with each of OpenFlow switches 82 to configure the flow tables therein and to receive copies of PDUs sent to OpenFlow controller 92 by OpenFlow switches 82. OpenFlow switches 82 also send OpenFlow controller 92 identifiers for the respective physical and virtual (if any) ports on which PDUs are received. A port on which a PDU is received is also referred to as an "in port." OpenFlow controller 92 analyzes the received PDUs and associated in ports to determine an overlay network layer topology for multi-topology network 80. In this example, in other words, OpenFlow controller 92 performs L2 topology discovery. For example, OpenFlow controller 92 may receive a message in an OpenFlow protocol session 94 from OpenFlow switch 82F that includes a copy of a PDU received by OpenFlow switch 82F at port P1. The PDU specifies a destination MAC address D. OpenFlow controller 92 may have previously configured OpenFlow switch 82D to output PDUs having destination MAC address D to port P2 of OpenFlow switch 82D. OpenFlow controller 92 may use this information to determine that a L2 link is present in the overlay network layer between OpenFlow switch 82D and 82F. OpenFlow controller 92 provides the discovered L2 topology to PCE 8, which stores the L2 topology to a multi-topology database, which may be an example of MT TED 54 of FIG. 2. OpenFlow controller 92 may represent an example of overlay controller 14 of FIG. 1. In some examples, OpenFlow controller 92 is incorporated within PCE 8.

PCE 8 presents an interface by which clients may request, for a specified time, a dedicated path between any combination of hosts 84. PCE 8 uses base network topology information for multi-topology network 80 received from ALTO server 90, overlay network topology information for multi-topology network 80 received from OpenFlow controller 92, and path status information received from PCCs 88 to compute and schedule paths between hosts 84 through multi-topology network 80 that satisfy the parameters for the paths requested by the clients. PCE 8 may receive multiple path requests from clients that overlap in time. PCE 8 reconciles these requests by scheduling corresponding paths for the path requests that traverse different parts of multi-topology network 80 and increase capacity utilization, for example, or by denying some of the path requests.

At the scheduled time for a scheduled path, PCE 8 installs forwarding information to multi-topology network 80 nodes (e.g., OpenFlow switches 82 and routers 86) to cause the nodes to forward traffic in a manner that satisfies the requested path parameters. A requested path may traverse either or both domains of multi-topology network 80. That is, a requested path may traverse either or both of the base network layer and overlay network layer of multi-topology network 80. Example path setup operations for different combinations of network layers traversal are described with respect to FIGS. 9-15.

PCE 8 installs forwarding information to OpenFlow switches 82 using OpenFlow controller 92. OpenFlow controller 92 presents a programming interface by which PCE 8 may configure flow tables of OpenFlow switches 82 using OpenFlow protocol sessions 94. PCE 8 invokes the programming interface of OpenFlow controller 92 by sending overlay network path setup messages (not shown in FIG. 3) directing OpenFlow controller 92 to establish paths in the overlay network layer of multi-topology network 80 and/or steer flows from hosts 84 onto established paths. OpenFlow controller 92 responds to overlay network path setup messages by installing forwarding information to OpenFlow switches 82 that implements the paths and/or directs flows received from hosts 84 onto established paths.

PCE 8 installs forwarding information to routers 86 using PCEP sessions 85 with PCCs 88 and, in some instances, using network management interfaces to router routers 86. PCE 8 may invoke the network management interfaces of routers 86 to configure a tunnel (e.g., an LSP), install static routes, configure a VPLS instance, configure IRB interface 87, and to otherwise configure routers 86 to forward packet flows in a specified manner. PCE 8 also communicates with PCCs 88 to direct routers 86 to signal LSPs through the base network layer of multi-topology network 80 to establish paths that may be used by the overlay network to transport L2 traffic along scheduled paths.

In this way, the described techniques use network application programming interfaces (APIs), i.e., PCEP and Open-Flow, to obtain topology information for multiple layers of multi-topology network 80 and also to program ephemeral forwarding information into the multiple layers. Obtaining topology information for multiple layers allows PCE 8 to have access to a full multi-topology and utilization of the network for path computation. As a result, the techniques may improve network utilization by steering traffic to under-utilized portions of multi-topology network 80. In addition, the techniques may avoid programming forwarding information into nodes of multi-topology network 80 using configuration methods, which may require commits involving significant overhead.

Figure 4:
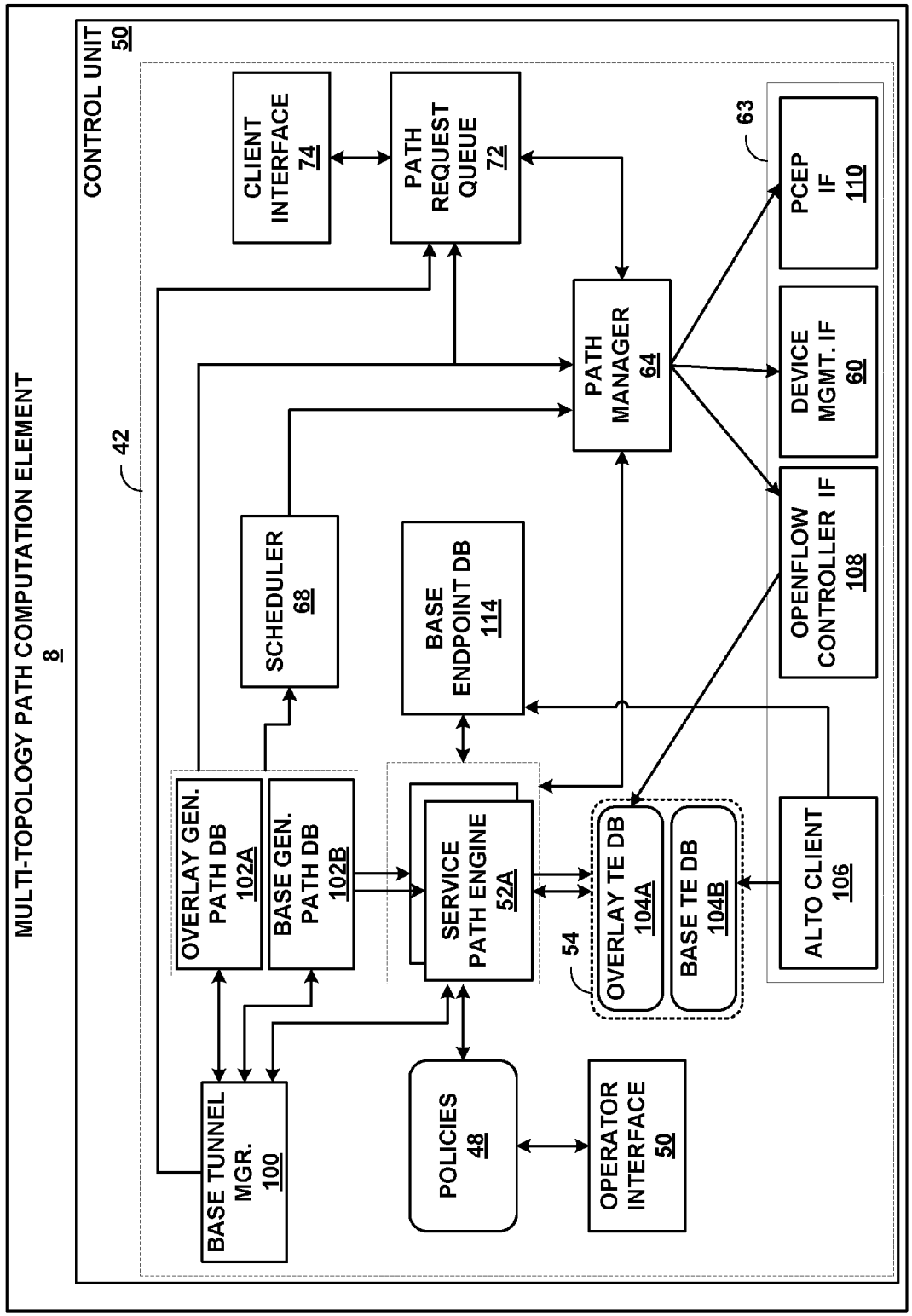
FIG. 4 is a block diagram illustrating an example path computation element that programs paths into a multi-topology network using techniques that accord with this disclosure.

FIG. 4 is a block diagram illustrating an example path computation element that programs paths into a multi-topology network using techniques that accord with this disclosure. Multi-topology path computation element 8, in this example, represents an example of PCE 8 for multi-topology network 80 of FIG. 3. As described with respect to FIG. 3, example multi-topology network 80 includes an L3 base network layer and an L2 overlay network layer.

PCE 8 of FIG. 4 includes interfaces to ALTO server 90, OpenFlow controller 92, and PCCs 88. ALTO client 106 communicates with ALTO server 90 using ALTO protocol to receive network and cost maps for multi-topology network 80. In particular, ALTO client 106 receives an endpoint prefix network map for storage as base endpoint database 114 (illustrated as "base endpoint DB 114"). The endpoint prefix map and base endpoint database 114 describes reachability to L3 prefixes from respective routers 86. ALTO client 106 additional receives a network map and, in some cases, a cost map that describes an L3 traffic engineering database for the base network layer at link-level granularity, where link-level refers to the level of individual interfaces of routers 86. ALTO client 106 stores a representation of the network and cost map as base TE database 104B ("base TE DB 104B") that is part of MT TED 54. FIG. 7 provides an example representation of base TE DB 104B.

OpenFlow controller interface (IF) 108 invokes an API or other interface exposing functionality of OpenFlow controller 92 to receive overlay topology information and to configure OpenFlow switches 82. OpenFlow controller IF 108 installs overlay topology information to overlay traffic engineering database 104A ("overlay TE DB 104A"). Overlay TE DB 104A is an L2 topology and can change as OpenFlow controller IF 108 receives new overlay topology information specifying the addition or modification of configurable L2 links in the overlay network (such as newly added tunnels, e.g., TE LSPs). Base tunnel manager 100 may modify overlay TE DB 104A to include traffic engineering information for tunnels established by base tunnel manager 100 (illustrated as "base tunnel mgr. 100"). For example, overlay TE DB 104 may receive from OpenFlow controller IF 108 overlay topology information specifying a new overlay network link that is a tunnel (or "generated path") in base generated path DB 102B. Base tunnel manager 100 may correlate the new overlay network link to the tunnel and associate the tunnel TE properties with the new overlay network link in overlay TE DB 104A. As a result, SPEs 52 may use overlay network link TE properties when computing requested paths through multi-topology network 80.

PCEP interface (IF) 110 implements PCE communication protocol (PCEP) extensions to receive and send extended PCEP messages to enable base tunnel manager 100. That is, PCEP IF 110 establishes extended PCEP sessions 85 with PCCs 88 operating on MPLS-enabled routers 86 in multi-topology network 80. Via the extended PCEP sessions, PCEP IF 110 receives LSP state reports that include up-to-date LSP state for LSPs owned by the corresponding clients. When PCEP IF 110 receives new LSP state information, base tunnel manager 100 may modify base generated path database 102B (illustrated as base gen. path DB 102B") to denote scheduled paths as "active" or to indicate path setup or path failure, for example. LSP state reports may be included in PCRpt messages. LSP state, received by PCEP IF 110 and stored to base generated path database 102B, for an LSP may include, for example, the LSP status (e.g., up/down), symbolic name for inter-PCEP session persistence, LSP attributes such as setup priority and hold priority, number of hops, the reserved bandwidth, a metric that has been optimized for the LSP (e.g., an IGP metric, a TE metric, or hop counts), and a path followed by the LSP. In this way, PCEP IF 110 may maintain strict synchronization between PCE 8 and the set of computed paths and reserved resources in use in the base network layer of multi-topology network 80. This may allow path manager 64 to reroute paths where needed to improve network performance.

In addition, PCEP IF 110 may advertise PCE 8 as having an LSP update capability. As a result, LSP state reports received by PCEP IF 110 may in some case include a delegation that provides access rights to PCE 8 to modify parameters of the target LSP. In some instances, the delegation may specify the particular parameters of the target LSP that are exposed for modification. Base tunnel manager 100 invokes PCEP IF 110 to send LSP update requests that specify the LSP parameter modifications for delegated LSPs. LSP update requests may be included in PCUpd messages and may be specified by an Explicit Route Object (ERO). In this way, path manager 64 may establish paths through the base layer of multi-topology network 80. PCEP IF 110 also implements functionality for the operation of conventional PCEP, such as path computation request/reply messages.

FIG. 5 is a block diagram illustrating an example graph that represents a combined network map and cost map that describes an endpoint database for a multi-topology network in accordance with techniques described herein. In this example, graph 130 includes PIDs 132A-132D (collectively, "PIDs 132") specified by an ALTO network map that may be generated by ALTO server 90 of FIG. 3. Each of PIDs 132 represents one of routers 86 of multi-topology network 80 of FIG. 3 and includes one of router identifiers (RTR-IDs) 134A-134D for the router and, in some instances, one or more prefixes reachable from the represented router. Each of PIDs 132 thus has router-level granularity. For example, PID 132D specifies RTR-ID 134D for router 86D from which prefix 136 (having value 3.0.0.0/8) is reachable. Router identifiers may be network addresses or another value that distinguishes routers 84 from one another.

Links connecting PIDs 132 may be specified by an ALTO cost map that may be generated by ALTO server 90 and denote a network link between the corresponding routers 86 of connected pairs of PIDs 132. In some examples, graph 130 may not include links connecting PIDs 132. PCE 8 uses graph 130 as an endpoint database to identify ingress and egress routers 86 of the base network layer in order to compute paths connecting hosts 86 of multi-topology network 80.

Figure 6:
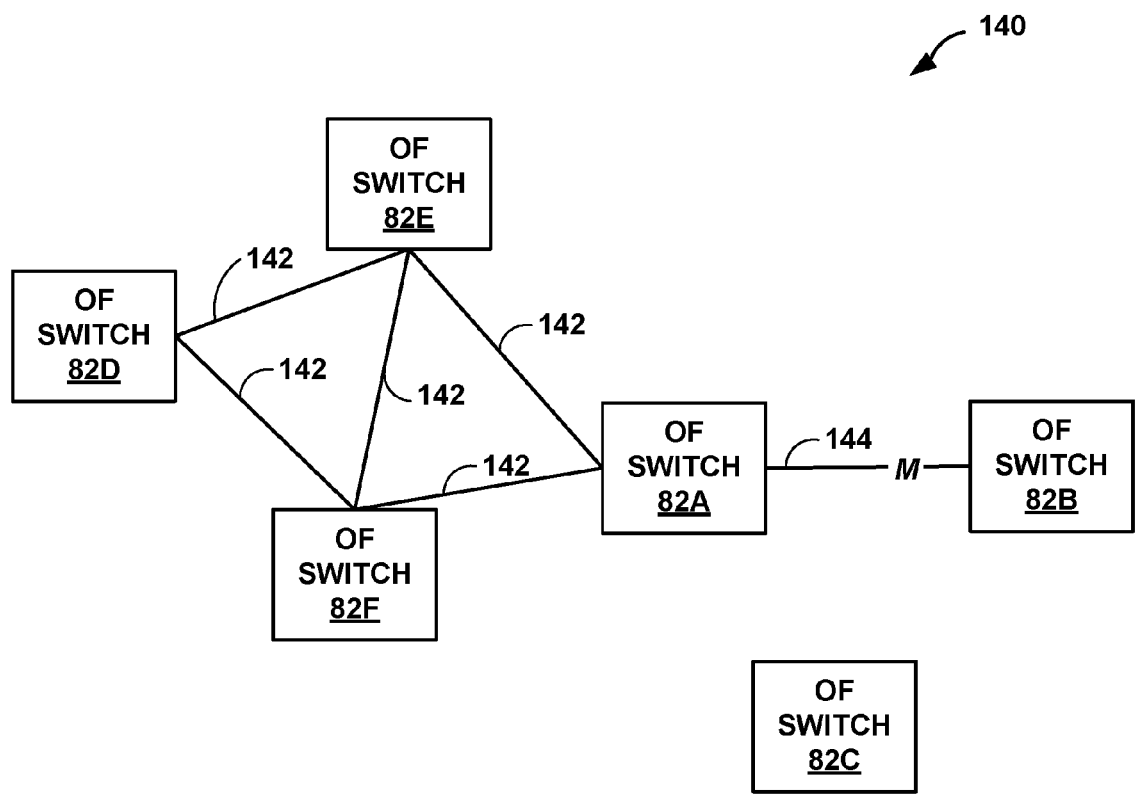
FIG. 6 is a block diagram illustrating an example graph that represents a topology of an overlay network of a multi-topology network generated in accordance with techniques described herein.

FIG. 6 is a block diagram illustrating an example graph that represents a topology of an overlay network of a multi-topology network in accordance with techniques described herein. Graph 140 illustrates a representation of an L2 Overlay traffic engineering database for OpenFlow switches 82 that may be generated by OpenFlow controller 92 of FIG. 3. Links 142 represent L2 links directs connecting L2 interfaces of OpenFlow switches 82. Link 144 represents a L2 link that include tunnel 83 of FIG. 3 connecting two virtual L2 interfaces. OpenFlow controller 92 may add links 142 and link 144 to graph 140 as learned from OpenFlow switches via OpenFlow protocol sessions 94. Base tunnel manager 100, having set up tunnel 83, may associate a traffic engineering metric M with link 144 in graph 140 (e.g., overlay TE DB 104A of FIG. 4). In this way, path manager 64 may account for metric M when computing paths through the overlay network of multi-topology network 80. Metric M may include, for example, a value for a maximum transmission unit, link color, administrative metric, price per MB transported, optical path, link type, link identifier, or configured link bandwidth. As seen in the above examples, metric M may represent a cost.

Each of links 142 and link 144 may be associated in the L2 overlay TE DB with a node identifier and a logical interface identifier. A combination of a node identifier and a logical interface identifier may be used by clients to specify an endpoint for end-to-end paths. The node identifier may refer to one of OpenFlow switches 82, while a logical interface identifier refers to a virtual or physical L2 interface, such as an LSP interface or GigE interface, respectively.

FIG. 7 is a block diagram illustrating an example graph that represents a topology of a base network of a multi-topology network generated in accordance with techniques described herein. Graph 150 includes PIDs 154A-154H (collectively, "PIDs 154") specified by an ALTO network map that may be generated by ALTO server 90 of FIG. 3. Graph 150 may be an abstract representation of base TE DB 104B of FIG. 4. Each of PIDs 154 represents and specifies one of network interfaces 152A-152H (collectively, "network interfaces 152") to the base network of multi-topology network 80 of FIG. 3. As a result, graph 150 has link-level granularity.

Each of network interfaces 152 may be associated with a network address for a router and can source and sink network traffic to/from other network interfaces connected to the network interface. A network interface may be associated with multiple logical or physical interfaces. In some cases, multiple PIDs 154 may have identical router identifiers (RTR-IDs) 134. This indicates that the multiple PIDs represent network interfaces located on the same router identified by the router identifier. For example, PIDs 154A and 154B each include RTR-ID 134A, indicating PIDs 154A and 154B represent network interfaces 152A and 152B that are located on the router identified by RTR-ID 134A.

Graph 150 also includes unidirectional links connecting pairs of PIDs 154. Links may be specified by an ALTO cost map generated by ALTO server 90. Each link represents an L3 network link for the base network layer of multi-topology network 80. Each link includes a traffic engineering cost (e.g., 0 or Cx), which may represent a value for bandwidth, cost per megabyte, latency, or other traffic engineering metrics for the link. Links connecting multiple PIDs 154 of the same router have cost 0. For example, PIDs 154A and 154B located on the router identified by RTR-ID 134A (e.g., router 86A of FIG. 3) have inter-PID costs of 0 in both directions, as indicated by the illustrated unidirectional links. In some instances, ALTO server 90 may provide multiple instances of ALTO cost maps to a path computation element, where each instance includes costs for a different traffic engineering metric (e.g., one ALTO cost map for bandwidth, another ALTO cost map for price, etc).

Figure 8:
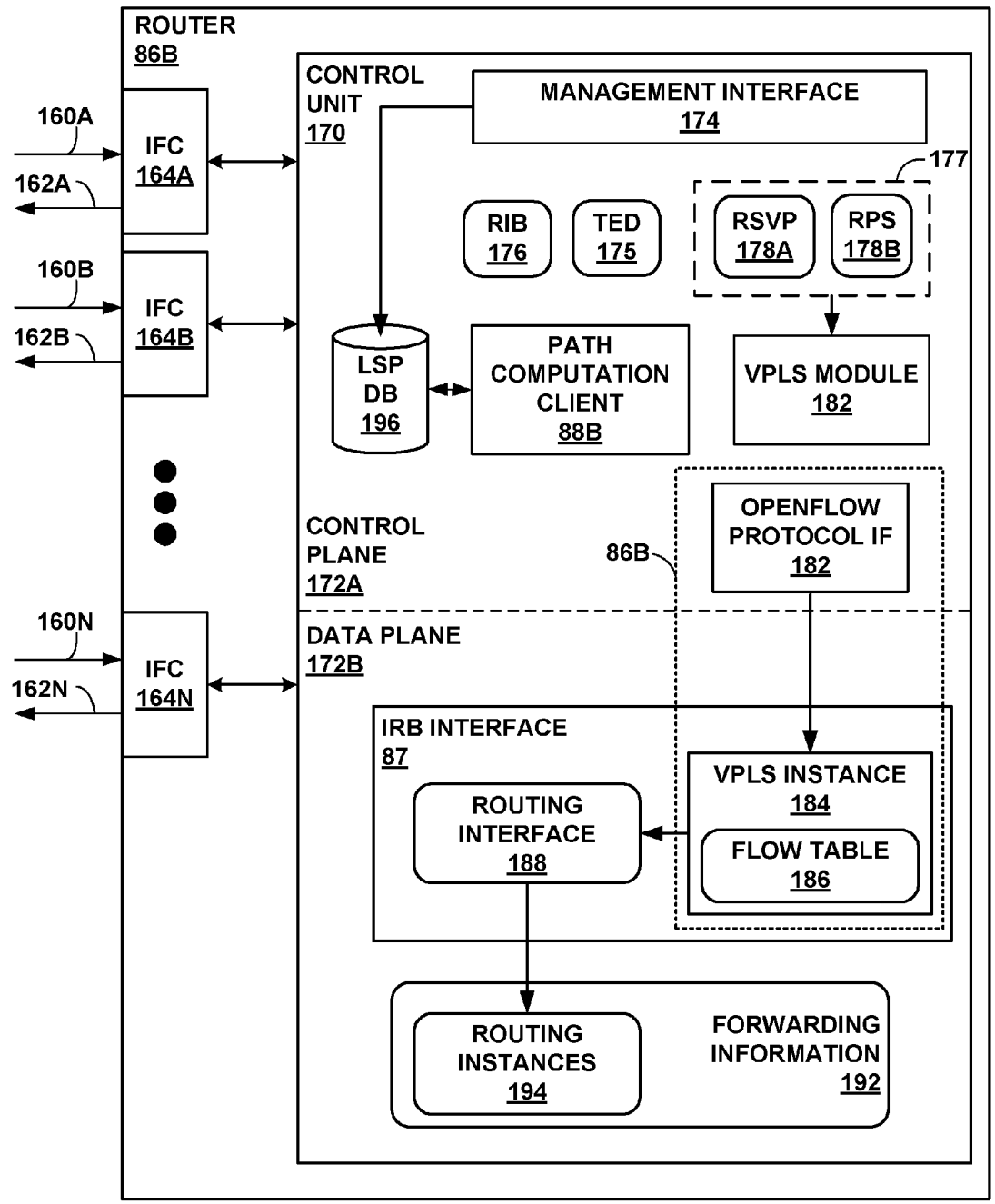
FIG. 8 is a block diagram illustrating an example router that provides layer two (L2) and layer three (L3) topology information and receives L2 and L3 forwarding information from a path computation element in accordance with techniques described herein.

FIG. 8 is a block diagram illustrating an example router that provides L2 and L3 topology information and receives L2 and L3 forwarding information from a path computation element in accordance with techniques described herein. For purposes of illustration, router 86B may be described below within the context of example multi-topology network system 80 of FIG. 3 and may represent any one of routers 86. Some examples of router 86B may not include the full functionality described and illustrated. For instance, some examples of router 86B may include different combinations of PCC 88B, OpenFlow switch 86B, and IRB interface 87, rather than all such components. Moreover, while described with respect to a particular network device, e.g., a router, aspects of the techniques may be implemented by any network device or combination of network devices. The techniques should therefore not be limited to the exemplary embodiments described in this disclosure.

Router 86B includes a control unit 170 and interface cards 164A-164N (collectively, "IFCs 164") coupled to control unit 170 via internal links. Control unit 170 may include one or more processors (not shown in FIG. 8) that execute software instructions, such as those used to define a software or computer program, stored to a computer-readable storage medium (again, not shown in FIG. 8), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 170 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 170 is divided into two logical or physical "planes" to include a first control or routing plane 172A ("control plane 172A") and a second data or forwarding plane 172B ("data plane 172B"). That is, control unit 170 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 172A of control unit 170 executes the routing functionality of router 86B. In this respect, control plane 172A represents hardware or a combination of hardware and software of control unit 170 that implements routing protocols. In this example, routing protocol daemon (RPD) 177 is a process executed by control unit 170 that executes routing protocols 178B (illustrated as "RPs 178B") by which routing information stored in routing information base 176 ("RIB 176") and traffic engineering information stored in traffic engineering database 175 ("TED 175") may be determined. In addition, RPD 177 may establish peering sessions for one or more routing protocols 178B with another router, route reflector, or routing protocol listener (e.g., ALTO server 90 of FIG. 3) and send L3 topology and/or traffic engineering in RIB 176 and/or TED 175 to the peers.

Routing protocols 178B may include, for example, IGPs such as OSPF-TE or IS-IS-TE and/or exterior gateway protocols such as BGP-TE. RIB 176 and TED 175 may include information defining a topology of a network, such as the base network layer of multi-topology network 80 of FIG. 3. Routing protocol daemon 177 may resolve the topology defined by routing information in RIB 176 to select or determine one or more routes through the network. Control plane 172A may then update data plane 172B with these routes, where data plane 172B maintains these routes as forwarding information 192.

Forwarding or data plane 172B represents hardware or a combination of hardware and software of control unit 170 that forwards network traffic in accordance with forwarding information 192. RIB 176 may in some aspects comprise one or more routing instances implemented by router 86B, with each instance including a separate routing table and other routing information. Control plane 172A in such aspects updates forwarding information 192 with forwarding information for each of routing instances 194. In this respect, routing instances 194 each include separate forwarding information for use by data plane 172B in forwarding traffic in accordance with the corresponding routing instance. Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control plane 172A further includes management interface 174 by which a network management system or, in some instances an, administrator using a command line or graphical user interface, configures in VPLS module 182 one or more VPLS instances for a network to interconnect combinations of L2 networks into a single Ethernet domain. For example, an administrator may configure router 86B as a participant in a particular VPLS instance, such as VPLS instance 184. VPLS module 182 may perform auto-discovery or other techniques to determine additional routers participating in a VPLS instance and additionally performing signaling techniques to establish a full mesh of pseudowires between router 86B and each of the additional routers. Furthermore, while described as establishing and operating a VPLS, VPLS module 182 in various instances may establish and manage any type of L2VPN to provide an L2 emulation service that offers L2 interconnectivity.

Data plane 172B includes one or more forwarding units, such as packet forwarding engines ("PFEs"), that provides high-speed forwarding of network traffic received by interface cards 164 via inbound links 160A-160N to outbound links 162A-162N. Integrated routing and bridging interface 87 ("IRB interface 187") of data plane 172B processes and forwards network traffic received on interfaces associated with the IRB interface 87, which in this case includes interfaces associated with VPLS instance 184. An administrator may configure IRB interface 87 via management interface 174 to include VPLS instance 184 (an example of a bridging instance for a bridge domain) and to map routing interface 188 of IRB interface 87 to one of routing instances 194 of router 86B. Routing interface 188 may represent a next hop or other reference of a logical interface (IFL) of IRB interface 87, for example. In some embodiments, aspects of data plane 172B are distributed to a number of distributed forwarding units, such as packet forwarding engines, each associated with a different one or more IFCs 164. In these embodiments, IRB interface 87 may be may be distributed to the distributed forwarding units to enable high-speed integrated routing and bridging within the data plane.

Router 86B implements VPLS instance 184 associated with IRB interface 87 to operate as a virtual switch or virtual bridge to interconnect multiple L2 networks. VPLS instance 184 maps a gateway L2 address (e.g., a gateway MAC address) to routing interface 188, which maps to one of routing instances 194. In this respect, the gateway L2 address maps to the routing instance. IRB interface 87 classifies L2 PDUs received on an interface associated with VPLS instance 62 and destined for a gateway L2 addresses of VPLS instance 184 as L3 packets for routing using the one of routing instances 194 mapped to routing interface 188. In other words, when router 86B receives an L2 PDU on an interface associated with VPLS instance 184, IRB interface 87 determines the destination L2 address of the L2 PDU. When the destination L2 address matches the gateway L2 address mapped to routing interface 188, IRB interface 87 classifies the L2 PDU as an L3 packet and provides the L2 PDU to the mapped one of routing instances 194 for L3 forwarding by data plane 172B. IRB interface 87 may decapsulate the L2 PDU of the L2 header and footer. When a destination L2 address of an L2 PDU does not match the gateway L2 address, VPLS instance 184 may switch the L2 PDU according to a matching flow entry of flow table 186. As a result, router 86B may operate as a gateway between an L2 overlay network layer and an L3 base network layer of multi-topology network 80. In some instances, IRB interface 87 performs a prior logical operation to classify L2 PDU as either routing traffic or bridging traffic, and then bridges the traffic or provides the traffic to a routing interface based on the result of classification.

Router 86A implements OpenFlow switch 82B to control switching of L2 PDUs among the set of virtual and/or physical interfaces of router 86A that are associated with VPLS instance 184. Such interfaces may include attachment circuits for attaching L2 networks to VPLS instance 184. OpenFlow protocol interface (IF) 182 of control plane 172A establishes an OpenFlow protocol session with an OpenFlow controller to provide L2 topology information and to receive forwarding information. OpenFlow protocol IF 182 installs flow entries received in the OpenFlow protocol session to flow table 186 to direct forwarding of PDUs received on interfaces associated with the VPLS instance 184. In some instances, VPLS instance 184 includes a L2 learning table and performs L2 learning with respect to interfaces of router 86B associated with VPLS instance 184.

A network management system or, in some instances, an administrator using a command line or graphical user interface may invoke management interface 174 to configure label switched paths described in LSP database 196 (illustrated as "LSP DB 196"). LSP database 196 includes LSP configuration data, for example, an LSP destination, path (e.g., a Reported Route Object), and LSP attributes such as setup priority and hold priority, number of hops, the reserved bandwidth, and/or a metric that has been optimized for the LSP (e.g., an IGP metric, a TE metric, or hop counts). LSP database 196 may also include information designating zero or more attributes of each configured LSP as delegable parameters that may be set/modified by a PCE using extended PCEP to modify the operation of the LSP when set up in the network. LSP attributes may be divided into three categories: (1) non-delegable parameters that RPD 177 applies immediately using RSVP 178A and that are neither re-signalled nor overridden by a PCE, (2) delegable parameters that RPD 177 applies when the LSP is re-signaled due, e.g., to LSP failure, and (3) delegable parameters that may be overridden by a PCE and trigger re-signaling by RPD 177. All delegable LSP parameters may include a configured default value that RPD 177 applies when, for example, a PCEP session terminates, the PCE otherwise becomes unavailable, or the PCE returns a delegation.

RPD 177 sets up LSP described in LSP database 196 by executing a resource reservation protocol, which in this instance is RSVP 178B, that signals other routers in the network to reserve resources and provide MPLS forwarding information to RPD 177 for use in forwarding MPLS packets. Various instances of router 86B may also, or alternatively, use RSVP-TE or another Label Distribution Protocol (LDP) to signal LSPs. In addition, RPD 177 executes RPs 178B to receive traffic engineering information that affects the state of LSPs, such as failed links and preempted resources that may result in a down state for LSPs. RPD 177 may associate such LSP state information with corresponding LSPs in LSP database 196 and may further directs path computation client 88B to send one or more LSP state reports to a PCE in response, as described in further detail below.

Path computation client (PCC) 88B of control plane 172A mediates communication between RPD 177 and a path computation element (e.g., PCE 8 of FIG. 1 or FIG. 3). PCC 88B includes a PCE interface (not shown) that implements PCE communication protocol (PCEP) extensions to receive and send extended PCEP messages. The PCE interface also implements functionality for the operation of conventional PCEP, such as path computation request/reply messages.

Path computation client 88B establishes extended PCEP sessions with a PCE and sends, via the extended PCEP sessions, LSP state reports that include up-to-date LSP state for LSPs described in LSP state information. LSP state reports may be included in PCRpt messages. In this way, PCC 88B maintains strict LSP state synchronization between router 86B and the PCE, which the PCE may use when computing paths for an overlay network that make use of the LSPs.

In addition, PCC 88B may advertise router 86B as allowing modification of delegable parameters. As a result, LSP state reports sent by PCC 88B may in some case include a delegation that provides access rights to a PCE to modify parameters of the target LSP. In some instances, the delegation may specify the particular parameters of the target LSP that are exposed for modification. PCC 88B may, after delegating LSPs, receive LSP update requests that specify LSP parameter modifications for one or more of the LSPs. LSP update requests may be included in PCUpd messages. PCC 88B, in response, notifies RPD 177 of new parameters for target LSPs identified in LSP update requests. RPD 177 may re-signal the target LSPs, in turn, and as new LSPs are established, switch traffic over to the new LSPs and send a notification to PCC 88B that the new LSPs have been successfully signaled. PCC 88B provides this updated LSP state in LSP status reports to a PCE with which router 86B has extended PCEP sessions. Router 86B thus extends existing RSVP-TE functionality with an extended PCEP protocol that enables a PCE to set parameters for a TE LSP configured within the router. In this way, router 86B may implement an SPVC-like model to allow a bandwidth calendaring application executing on a PCE to signal computed paths through a multi-topology network, thereby dynamically setting up end-to-end paths as requested by clients.

Figure 9:
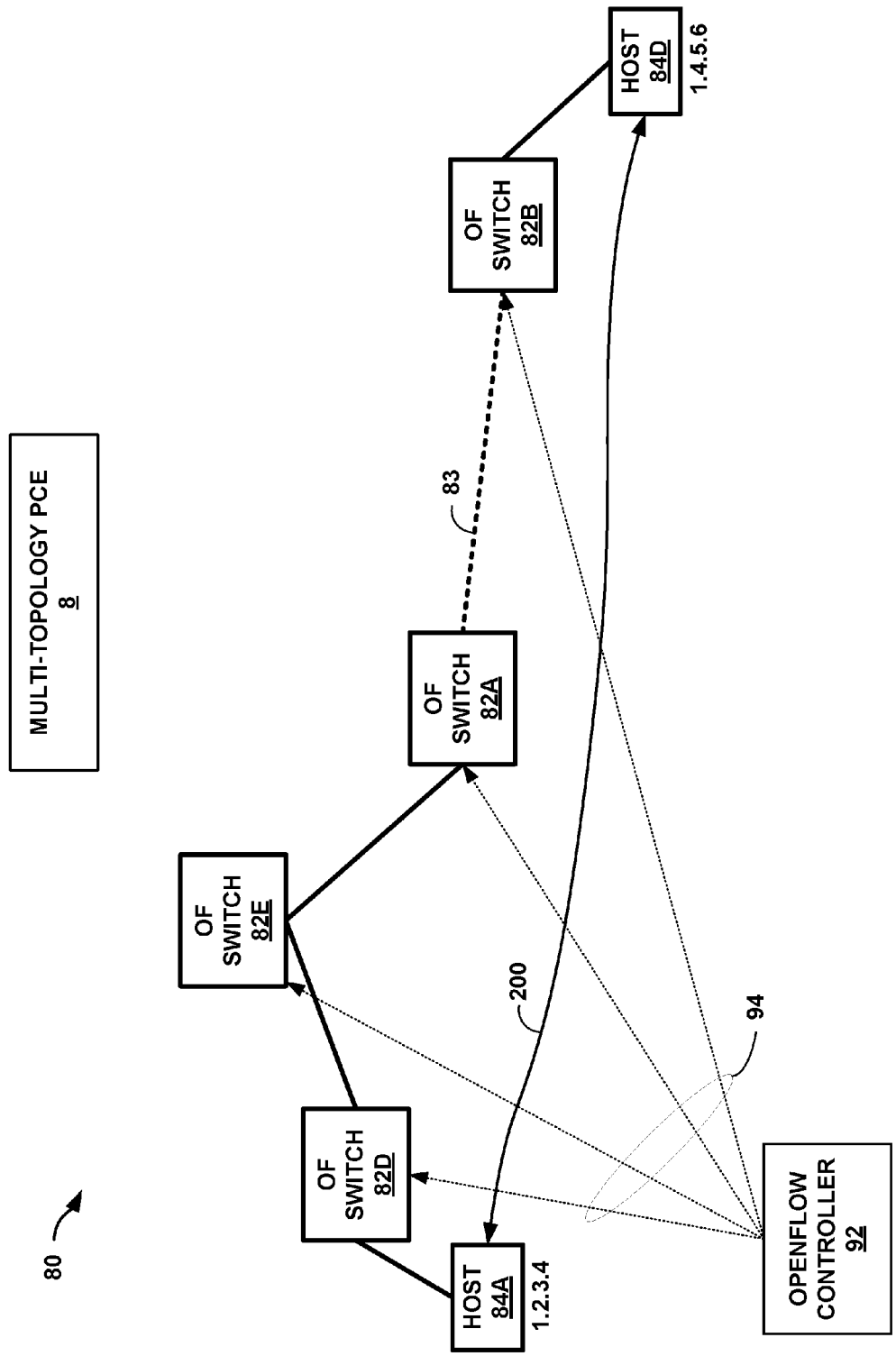
FIG. 9 is a block diagram illustrating path setup in an overlay network layer of a multi-topology network by a bandwidth calendaring application according to techniques of this disclosure.

FIG. 9 is a block diagram illustrating path setup in an overlay network layer of a multi-topology network by a bandwidth calendaring application according to techniques of this disclosure. In the illustrated example, a reduced representation multi-topology network 80 is shown for simplicity. Multi-topology PCE 8 ("PCE 8") receives a request from a client to establish a path between two endpoints, in this case hosts 84A and 84D. Each of hosts is logically located within the switching domain of the overlay network layer of multi-topology network 80. As a result, the path to be established may reside entirely in the overlay network layer. In this case, the requested path is bi-directional (illustrated as path 200).

PCE 8 processes the path request according to associated path constraints, if any, provided by the requesting client the path. Upon successfully computing two opposing direction, unidirectional paths through the overlay network layer between hosts 84A and 84B for path 200, PCE 8 schedules the unidirectional paths for setup at the requested time. At the scheduled time, PCE 8 directs OpenFlow controller 92 to use OpenFlow protocol sessions 94 to install flow entries in each of OpenFlow switches 82D, 82E, 82A, and 82B to direct L2 PDUs from host 84A to host 84D along a unidirectional path through the overlay network layer toward host 84D and to direct L2 PDUs from host 84D to host 84A along a unidirectional path through the overlay network layer toward host 84A. In this way, PCE 8 establishes path 200 through multi-topology network 80 using a PVC-like model. An example mode of operation for PCE 8 for establishing path 200 is described in further detail with respect to FIGS. 11A-11B.

Figure 10:
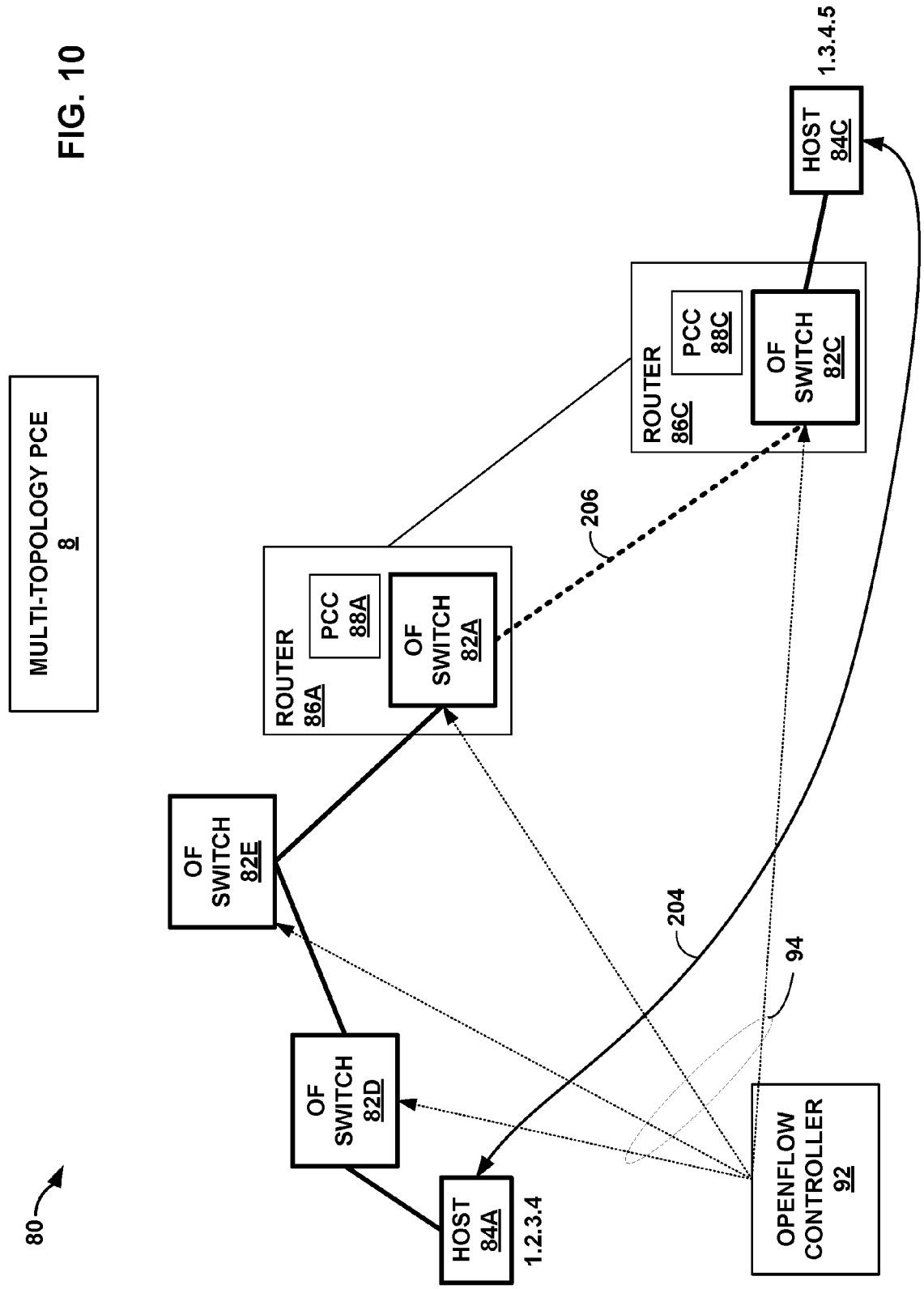
FIG. 10 is a block diagram illustrating path setup in an overlay network layer of a multi-topology network by a bandwidth calendaring application according to techniques of this disclosure.

FIG. 10 is a block diagram illustrating path setup in an overlay network layer of a multi-topology network by a bandwidth calendaring application according to techniques of this disclosure. In the illustrated example, a reduced representation multi-topology network 80 is shown for simplicity. Multi-topology PCE 8 ("PCE 8") receives a request from a client to establish a path between two endpoints, in this case hosts 84A and 84C. Each of hosts is logically located within the switching domain of the overlay network layer of multi-topology network 80. As a result, the path to be established may reside entirely in the overlay network layer. In this case, the requested path is bi-directional (illustrated as path 210). However, as is shown in FIG. 3 and the L2 topology represented by graph 140 of FIG. 6, there does not exist at the time of the path request an overlay network link connecting OpenFlow switch 82C to the other OpenFlow switches 82. PCE 8 therefore establishes tunnel 212 in conjunction with routers 86A and 86C through the base network layer of multi-topology network 80 to connect OpenFlow switch 82C to OpenFlow switch 82A and enable an overlay network layer path between hosts 82A and 82C.

PCE 8 processes the path request according to associated path constraints, if any, provided by the requesting client the path. Initially, PCE 8 fails to compute two opposing direction, unidirectional paths through the overlay network layer between hosts 84A and 84C for path 210. PCE 8 therefore establishes tunnel 206 by configuring routers 86A and 86C using, in this example, a management interface to configure the router 86A and 86C and extended PCEP sessions with respective PCCs 88A and 88C. PCE 8 connects tunnel 206 interfaces to OpenFlow switches 82A and 82C to create an overlay link between OpenFlow switches 82A and 82C. Tunnel 206 having been established and installed into the overlay network layer topology, PCE 8 successfully computes the unidirectional paths for path 210 and schedules the computed paths.

At the scheduled time, PCE 8 directs OpenFlow controller 92 to use OpenFlow protocol sessions 94 to install flow entries in each of OpenFlow switches 82D, 82E, 82A, and 82C to direct L2 PDUs from host 84A to host 84C along a unidirectional path through the overlay network layer toward host 84C and to direct L2 PDUs from host 84C to host 84A along a unidirectional path through the overlay network layer toward host 84A. In this way, PCE 8 establishes path 204 through multi-topology network 80 using a PVC-like model. An example mode of operation for PCE 8 for establishing path 204 is described in further detail with respect to FIGS. 11A-11B.

Figure 11A:
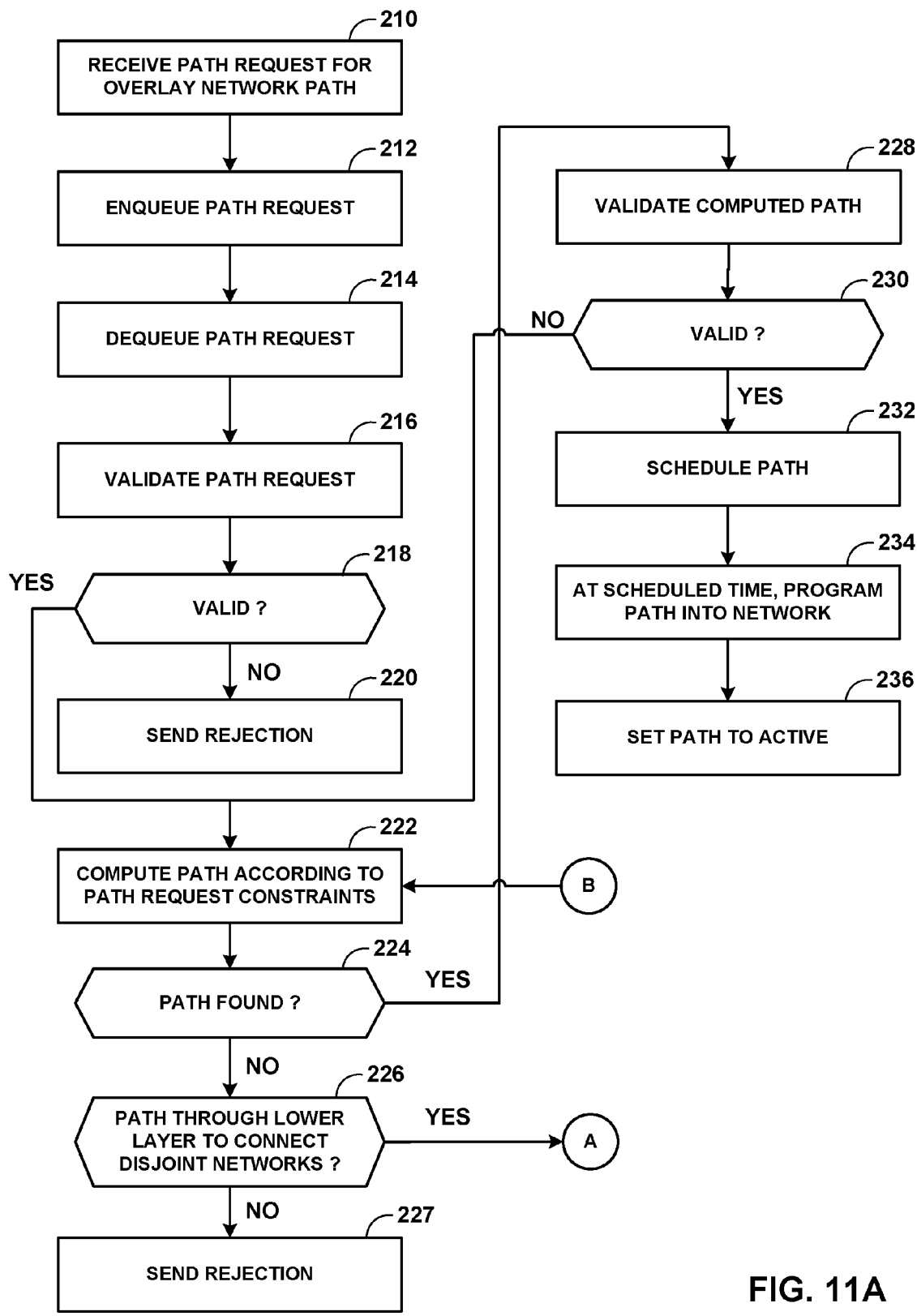
FIGS. 11A-11B include a flowchart illustrating an example mode of operation for a path computation element that includes a bandwidth calendaring application to program requested paths into a network at requested times in accordance with techniques described herein.
Figure 11B:
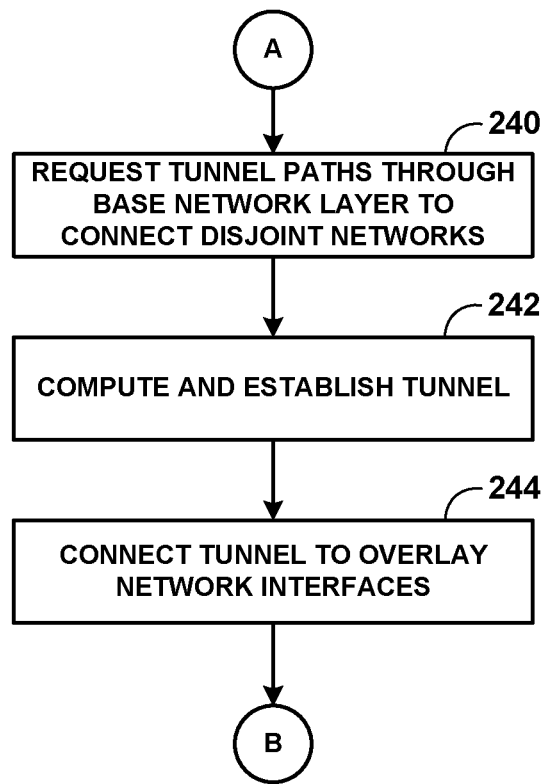

FIGS. 11A-11B include a flowchart illustrating an example mode of operation for a path computation element that includes a bandwidth calendaring application to program requested paths into a network at requested times in accordance with techniques described herein. The example mode of operation is described with respect to PCE 8 of FIG. 4 operating within multi-topology network 80 of FIG. 3.

Client interface 74 of bandwidth calendaring application 42 executing on PCE 8 receives a path request specifying two endpoints both located within an overlay network switching domain of multi-topology network 80 and also specifying path scheduling and path parameter information (210). While in this case, the requested path is an "end-toend" path, in some instances, the path request may specify multipoint-to-multipoint path. Endpoints may be specified as (overlay network node identifier, logical interface identifier) pairs having additional associated classifiers to identity the one or more matching flows for the path. Endpoints may be specified using endpoint identifiers, such as network addresses, for hosts. Scheduling information includes a path start time indicating the date and time at which the path should be activated. Scheduling information also includes either an end time for the path or a traffic volume limit. Upon reaching a traffic volume limit, PCE 8 deactivates the path. Client interface 74 enqueues the path request to path request queue 72 (212).

Path manager 64 dequeues the path request from path request 72 and selects one of service path engines 52 to process the path request (214). Because the path request in this example specifies endpoints in the overlay network, path manager 64 provides references to overlay TE DB 104A, base tunnel manager 100, and overlay generated path DB 102A to the selected service path engine 52.

The selected service path engine 52 validates the path request by ensuring that specified endpoints exist and are reachable by (in the case of hosts) or located on (in the case of node-interface pairs) one of OpenFlow switches 82 (216). In some instances, the selected service path engine 52 may also ensure the validity of the specified classifiers. If the requested path is invalid (NO branch of 218), path manager 64 sends a path rejection message, via client interface 74, to the client that requested the path (220). The path rejection message may detail the reasons for the rejection.

If the requested path is valid (YES branch of 218), the selected service path engine 52 prepares constraints for path computation using the state of the multi-topology network 80 from overlay TE DB 104A and overlay generated path DB 102A based on path parameters specified in the path request. If the path start time is in the future, the selected service path engine 52 uses the maximum bandwidth available (i.e., regardless of current utilization) for each link of the overlay network as reflected in overlay TE DB 104, for link utilization is indeterminate for future reservations. If, however, path activation is to be immediate, the selected service path engine 52 may use link utilization to determine whether path constraints may be met by a given overlay link. Further, if the path start time is in the future, the selected service path engine 52 computes the scheduled bandwidth on each link for the time interval between the path start time and path end time using reserved bandwidth information for scheduled paths in overlay generated path DB 102A. If the scheduled bandwidth on a link exceeds a configurable threshold specified in policies 48, the selected service path engine 52 excludes the link from path computation (in some examples, the threshold is 80% utilization). Overlay generated path DB 102A may store bandwidth requirements for each link by time in the overlay network as a sum of bandwidth requirements from all scheduled paths that include the link. If a traffic volume rather than an end time is specified in the path request, the selected service path engine 52 may estimate the end time based on the average transfer rate on the path. For example, the selected service path engine 52 may compute the estimated end time as (start time+volume/rate).

The selected service path engine 52 attempts to compute a path for the path request according to the prepared constraints (222). The selected service path engine 52 may lock overlay generated path DB 102A or otherwise execute the constraint preparation step as an atomic operation to prevent other service path engines 52 from scheduling additional paths during constraint preparation, which could lead to oversubscription of links if permitted.

If the selected service path engine 52 successfully computes a path for the path request (YES branch of 224), the selected service path engine 52 attempts to schedule the computed path in overlay generated path DB 102A. First, the selected service path engine 52 validates the computed path to ensure that path parameters may be satisfied despite other service path engines 52 possibly scheduling additional paths to overlay generated path DB 102A (228). If the computed path has been invalidated in the interim by such a circumstance (NO branch of 230), the selected service path engine 52 re-prepares the constraints and again attempts to compute a path for the path request according to the prepared constraints (222).

If the computed path remains valid (YES branch of 230), the selected service path engine 52 schedules the computed path to overlay generated path DB 102A for the associated start and end times (232). Validation (230) and path scheduling (232) may be executed atomically by the selected path engine 52. At the start time for the scheduled path, scheduler 68 triggers path manager 64 to program the scheduled path into the overlay network layer of multi-topology network 80 by using OpenFlow controller interface to direct OpenFlow controller 92 to install flow table entries that forward matching traffic along the scheduled path (234). As described in detail with respect to FIG. 14, in some instances, one of service path engines 52 may validate the scheduled path prior as part of an activation process. After establishing and, in some instances, receiving confirmation from OpenFlow controller 92 that the schedule path is operational, path manager 64 marks the scheduled path as active within overlay generated path DB 102A (236).

If the selected service path engine 52 is unable to compute a path according to the determined constraints (NO branch of 224), the selected service path engine 52 determines whether such failure due to the computed overlay network graph, after removing unusable edges unable to satisfy path request constraints, including two disjoint subgraphs of the overlay network. If this is not the case (NO branch of 227), path manager 64 sends a path rejection message, via client interface 74, to the client that requested the path (227). The path rejection message may detail the reasons for the rejection, where such reasons in this case include being unable to compute the requested path.

If the path could possibly be computed with a different overlay network topology, however, that connected the two disjoint subgraphs, i.e., if there exists a base network layer path through the base network layer that connects the two disjoint subgraphs (YES branch of 226), then the selected service path engine 52 requests overlay TE DB 104A to add an overlay link between a pair of OpenFlow switches 82, with one member of the pair being drawn from each of the subgraphs. The selected service path engine 52 may provide hints for the nodes to operate as endpoints for the overlay link. For example, with respect to FIG. 10, the selected service path engine 52 requests overlay TE DB 104A to create an overlay link between OpenFlow switches 82A and 82C. Overlay TE DB 104A, in turn, requests a new tunnel through the base layer between the pair of OpenFlow switches 82 (which overlap as base layer network nodes) from base tunnel manager 100 (240).

Base tunnel manager 100 maps the location of the overlay network nodes to the corresponding base layer network nodes. For example, OpenFlow switches 82A and 82C are located on respective routers 82A and 82C. Base tunnel manager 100 then generates a path request for a bidirectional tunnel connecting the corresponding base layer network nodes and enqueues the path request on path request queue 72. Path manager 64 computes and establishes the requested path according to techniques of this disclosure (242). After the tunnel is established, base tunnel manager 100 connects logical interfaces for the tunnel, which may include bidirectional TE LSPs, to the OpenFlow switches 82 to create the overlay network link (244). Base tunnel manager 100 also notifies overlay TE DB 104A that the requested overlay network link is active, which triggers recomputation (222).

Figure 12:
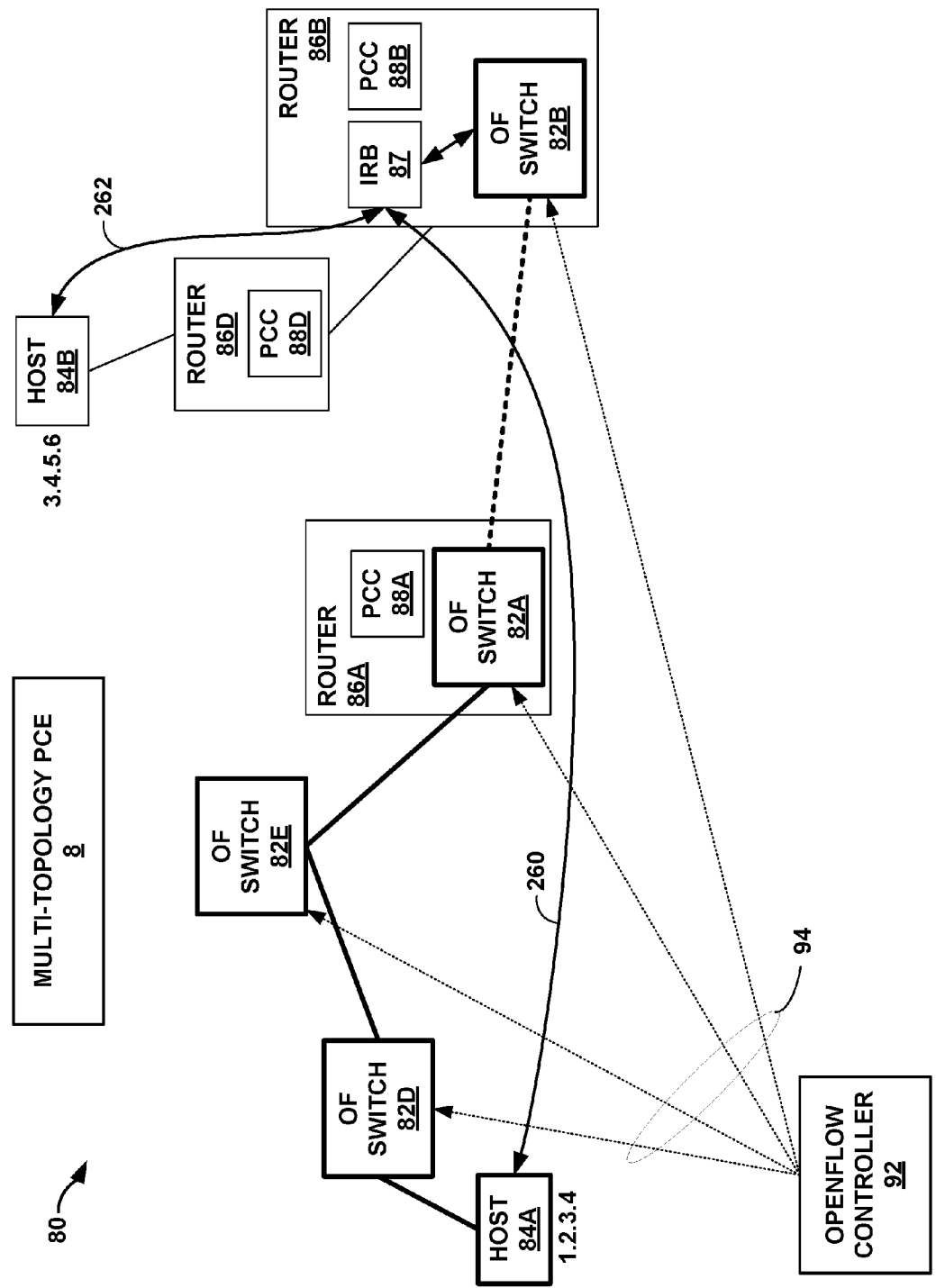
FIG. 12 is a block diagram illustrating path setup in multiple layers of a multi-topology network by a bandwidth calendaring application according to techniques of this disclosure.

FIG. 12 is a block diagram illustrating path setup in multiple layers of a multi-topology network by a bandwidth calendaring application according to techniques of this disclosure. In the illustrated example, a reduced representation multi-topology network 80 is shown for simplicity. Multi-topology PCE 8 ("PCE 8") receives a request from a client to establish a path between two endpoints, in this case hosts 84A and 84B. Host 84A is logically located within the switching domain of the overlay network layer of multi-topology network 80, but host 84B is not located in the switching domain of the overlay network. As a result, the path between the two endpoints to be established traverses IRB interface 87 that is a gateway between the overlay network layer and base network layer. In this case, the requested path is bi-directional (illustrated as a concatenation of sub-path 260 and sub-path 262).

PCE 8 processes the path request according to associated path constraints, if any, provided by the requesting client the path. Upon determining that host 84A is reachable by the overlay network layer while host 84B is not, PCE 8 establishes sub-path 260 between host 84A and IRB interface 87 using techniques of this disclosure. For example, PCE 8 may program OF switches 82D, 82E and 82A to forward L3 traffic destined for host 84B toward the gateway L2 address for IRB interface 87. PCE 8 may obtain the gateway L2 address using the Address Resolution Protocol (ARP). In addition, PCE 8 may establish a bi-directional tunnel for sub-path 262 from router 86B to router 86D using an extended PCEP session with PCC 88B. PCE 8 may bind this tunnel to a forwarding equivalence class (FEC) for a subnet reachable from router 86D that includes host 84B (e.g., 3.0.0.0/8) or for the host-specific classifier (e.g., 3.4.5.6). In the other direction, PCE 8 may bind this tunnel to a FEC for a subnet reachable from router 86B that includes host 84A (e.g., 1.0.0.0/8) or for the host-specific classifier (e.g., 1.2.3.4). PCE 8 may in this way connect sub-paths 260 and 262 over respective layers of multi-topology network 80 using IRB interface 87 to create a dedicated bidirectional path between hosts 84A and 84B in response to a path request from a client and groom flows directed to either of the hosts onto path 300.

Figure 13:
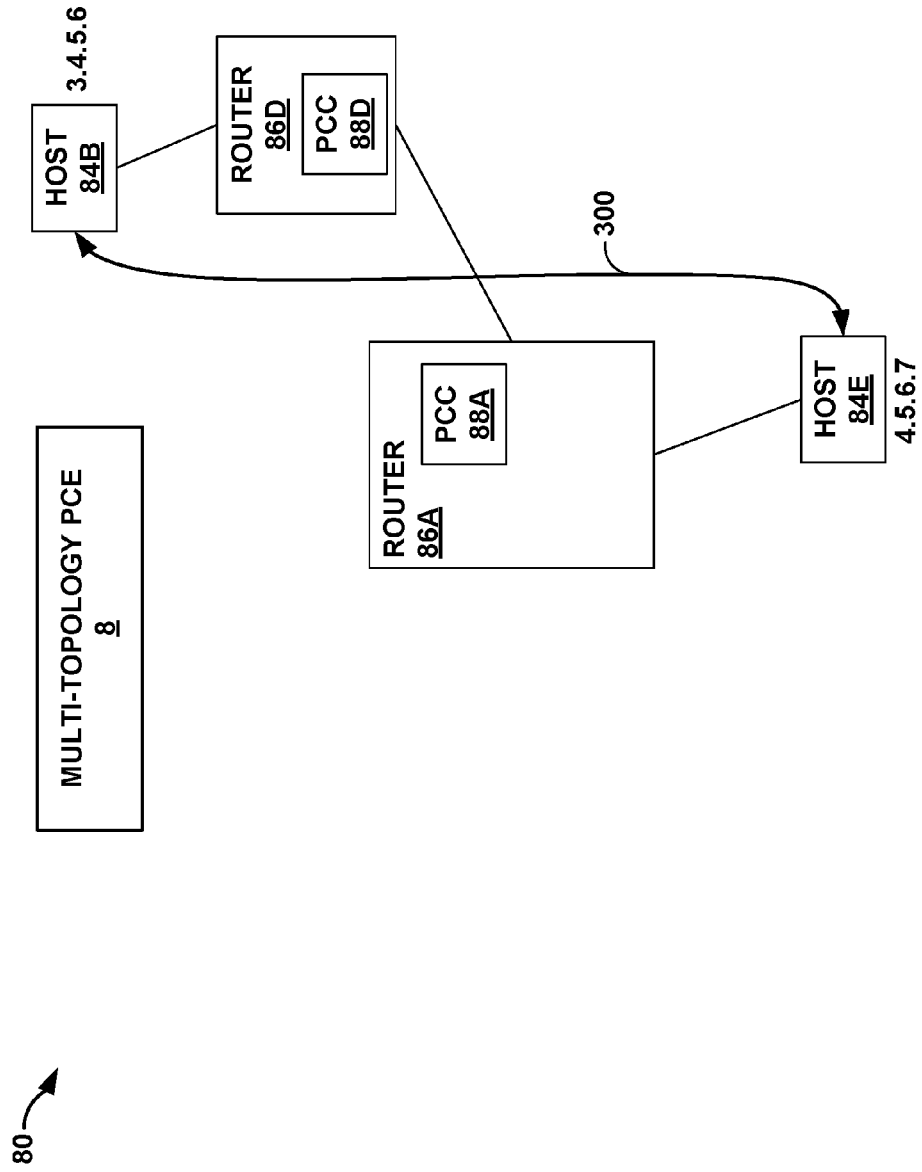
FIG. 13 is a block diagram illustrating path setup in a base layer of a multi-topology network by a bandwidth calendaring application according to techniques of this disclosure.

FIG. 13 is a block diagram illustrating path setup in a base layer of a multi-topology network by a bandwidth calendaring application according to techniques of this disclosure. In the illustrated example, a reduced representation multi-topology network 80 is shown for simplicity. Multi-topology PCE 8 ("PCE 8") receives a request from a client to establish a path between two endpoints, in this case hosts 84B and 84E, neither of which is reachable from the overlay network layer. In this case, the requested path is bi-directional (as illustrated by path 300).

PCE 8 processes the path request according to associated path constraints, if any, provided by the requesting client the path. Upon computing a path over the base network layer between routers 86A and 86B, PCE 8 creates a bi-directional tunnel between routers 86A and 86B for path 300 using extended PCEP session with PCCs 88A and 88B and by configuring, if needed, tunnel interfaces in routers 86A and 86B using respective management interfaces of the routers. PCE 8 may bind this tunnel to a forwarding equivalence class (FEC) for a subnet reachable from router 86B that includes host 84B (e.g., 3.0.0.0/8) or for the host-specific classifier (e.g., 3.4.5.6). In the other direction, PCE 8 may bind this tunnel to a FEC for a subnet reachable from router 86A that includes host 84E (e.g., 4.0.0.0/8) or for the host-specific classifier (e.g., 4.5.6.7). PCE 8 may in this way establish a path 300 over a base network layer of multi-topology network 80 to create a dedicated bidirectional path between hosts 84B and 84E in response to a path request from a client and groom flows directed to either of hosts 84B and 84E onto path 300.

Figure 14:
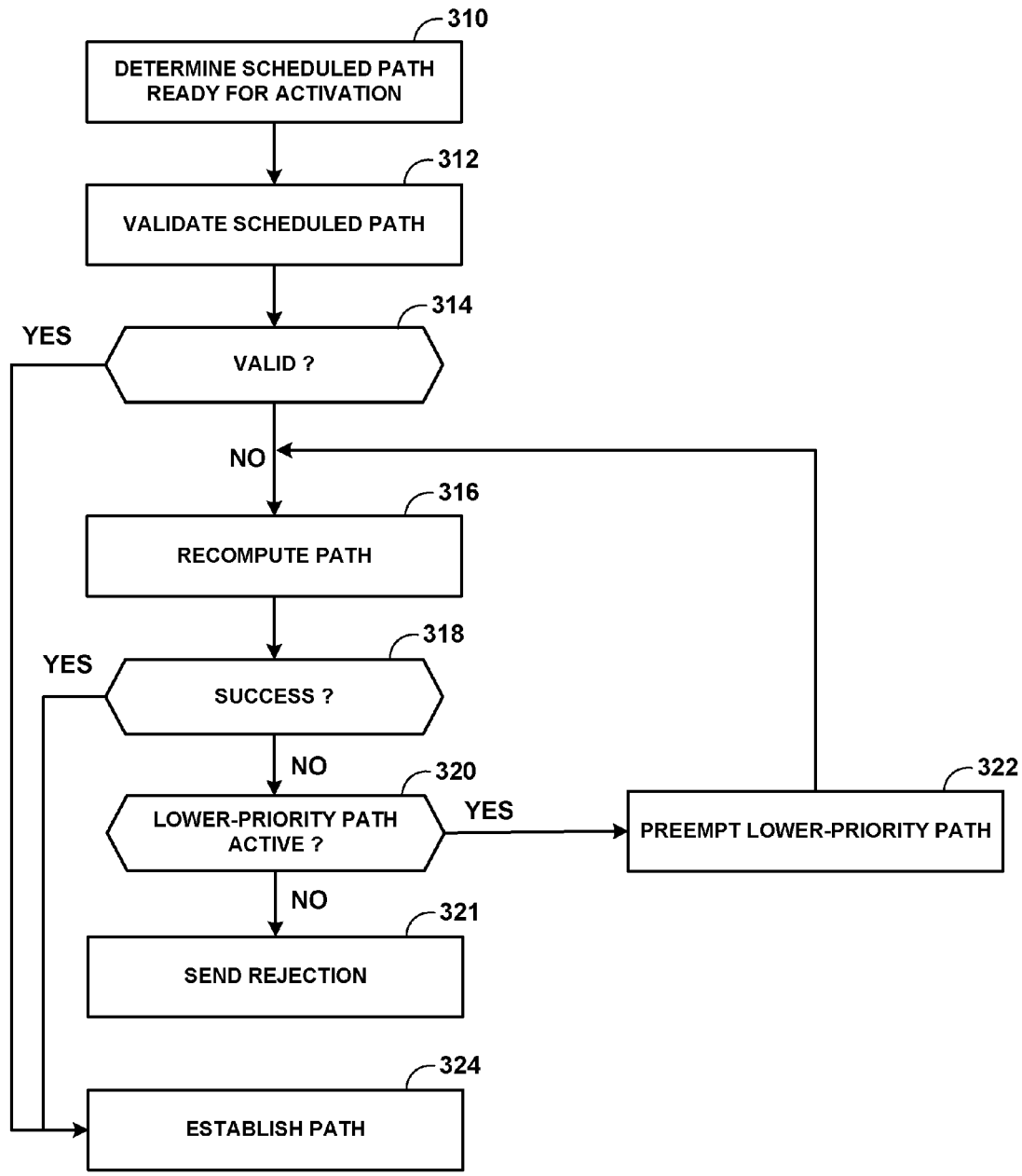
FIG. 14 is a flowchart illustrating an example mode of operation of a bandwidth calendaring application of a path computation element to activate a scheduled path in accordance with techniques described herein.

FIG. 14 is a flowchart illustrating an example mode of operation of a bandwidth calendaring application of a path computation element to activate a scheduled path in accordance with techniques described herein. In this example, overlay generated path DB 102A of BCA 42 of PCE 8 of FIG. 3 includes a path scheduled for activation at a start time. Scheduler 68 determines at the start time that the scheduled path is ready for activation and triggers path manager 64 to establish and activate the path (310). Path manager 64 selects one of service path engines 52 to validate the path against overlay TE DB 104B to determine whether the scheduled resources remain available for reservation (312). If the scheduled path remains valid (YES branch of 314), path manager 64 programs the scheduled path into multi-topology network 80 using any one or more of topology node interfaces 63 (324).

If the scheduled path is invalid (NO branch of 314), the selected service path engine 52 attempts to recomputed the path according to techniques described herein (316). If the recomputation is successful (YES branch of 318), path manager 64 programs the scheduled path into multi-topology network 80 using any one or more of topology node interfaces 63 (324). If the recomputation is unsuccessful (NO branch of 318), path manager 64 determines by policies 48 whether any currently active path in overlay generated path DB 102A is preempted by (e.g., has a lower priority than) the scheduled path. If no active paths are available to preempt (NO branch of 320), the scheduled path fails and path manager 64 sends a path rejection message detailing the reasons to the requesting client via client interface 74.

If, however, a currently active path stored by overlay generated path DB 102A may be preempted for the scheduled path (YES branch of 320), path manager 64 does so by putting the active path into a failed state and removing it from overlay generated path DB 102A (322). This may include tearing down the now failed path. Path manager 64 then selects one of service path engines 52 to recompute the scheduled path in a further attempt to establish the requested path (316).

Figure 15:
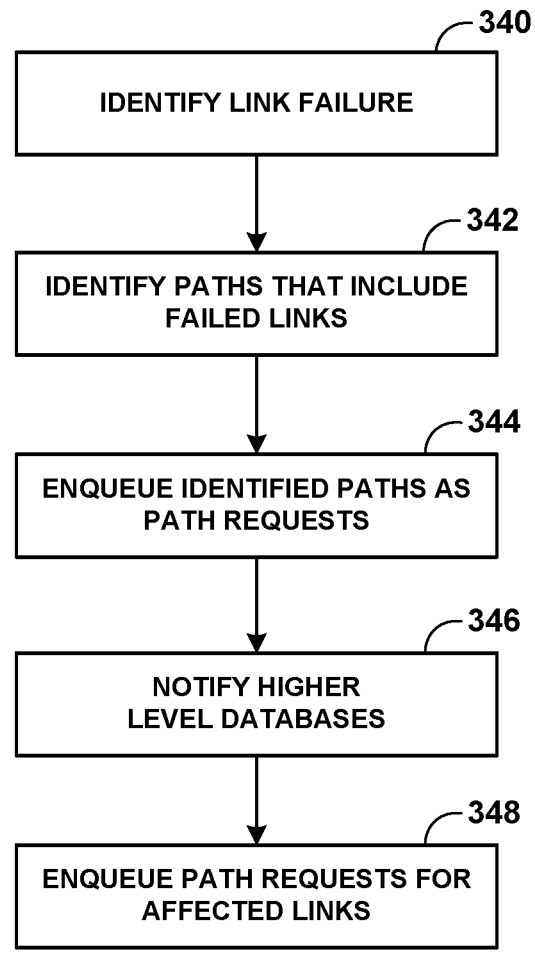
FIG. 15 is a flowchart illustrating an example mode of operation of a bandwidth calendaring application of a path computation element to handle a network link failure in accordance with techniques described herein.

FIG. 15 is a flowchart illustrating an example mode of operation of a bandwidth calendaring application of a path computation element to handle a network link failure in accordance with techniques described herein. The example mode is described with respect to BCA 42 of PCE 8 of FIG. 3. In this example, overlay TE DB 104A or base TE DB 104B of BCA 42 receives an advertisement or path failure message indicating an overlay link or base network link has failed (340). The path failure message may be an extended PCEP LSP state report indicating the LSP has failed. This event triggers the corresponding path database, overlay generated path DB 102A or base generated path DB 102B, to identify all paths that include the affected link (342). The corresponding path database enqueues all identified paths to path request queue 72 for recomputation and reestablishment of the affected paths by BCA 42 (344). In addition, if the failed link is a base network layer link, base TE DB 104B notifies overlay TE DB 104A and overlay generated path DB 102A that higher-layer links that include the failed link are no longer valid (346). In response, the higher layer databases may enqueue path requests for the affected higher-layer links to path request queue 72 (348).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a path computation element, topology information for a base network layer of a multi-topology network, the multi-topology network comprising the base network layer having a plurality of network switches interconnected by base network layer three (L3) links in a base network topology and also comprising an overlay network layer having a plurality of overlay switches interconnected by overlay network links in an overlay network topology;
receiving, by the path computation element from a client and via a client interface, a path request that specifies two endpoints and a requested bandwidth;
computing, by the path computation element in response to receiving the path request and using the topology information for the base network layer and the topology information for the overlay network layer, a computed path to transport network traffic between the two endpoints, wherein at least a portion of the computed path traverses the base network layer, and wherein a network switch of the plurality of network switches is an ingress network switch for the portion of the computed path;
by the path computation element and after computing the computed path, receiving additional topology information for at least one of the overlay network layer and the base network layer;
receiving, by the path computation element from the network switch via a communication session, a failure event message indicating a failure of the portion of the computed path;
computing, by the path computation element in response to the failure event message and using the additional topology information, a new computed path that does not include the portion of the computed path;
sending, by the path computation element, new forwarding information for the new computed path to the network switch when the path computation element successfully computes the new computed path; and
sending, by the path computation element to the client via the client interface, a path rejection when the path computation element is not able to compute the new computed path.

2. The method of claim 1, wherein the failure event message comprises a path setup failure event message that indicates the network switch failed to establish the portion of the computed path.

3. The method of claim 1, wherein the failure event message comprises a path failure event message that indicates the portion of the computed path established by the network switch has failed.

4. The method of claim 1, further comprising:
configuring, by the path computation element, an interface in the network switch for the portion of the computed path.

5. The method of claim 1, wherein sending new forwarding information for the new computed path to the network switch causes the network switch to establish a label switched path over the portion of the computed path.

6. The method of claim 1, wherein the failure event message comprises a label switched path state report message for a path computation element communication protocol (PCEP).

7. The method of claim 1, wherein the path request specifies a start time for path activation, the method further comprising:
scheduling, by the path computation element, the new computed path as a scheduled path for the start time, wherein sending the new forwarding information to the network switch comprises sending, by the path computation element, new forwarding information for the new computed path to the network switch at the start time.

8. The method of claim 7, further comprising:
storing the scheduled path to a generated path database of the path computation element; and
marking the scheduled path in the generated path database as active upon sending the new forwarding information.

9. The method of claim 7,
wherein the path request specifies a path request parameter, and
wherein computing the new computed path comprises computing the new computed path to satisfy the path request parameter, the method further comprising:
validating, by the path computation element, the new computed path by determining whether multi-topology network resources required to satisfy the path request parameter are available for reservation,
wherein sending the new forwarding information comprises sending, by the path computation element in response to determining the new computed path is valid, the new forwarding information.

10. A path computation element comprising:
one or more programmable processors operably coupled to a memory;
a multi-topology traffic engineering database to store topology information for a base network layer of a multi-topology network, the multi-topology network comprising the base network layer having a plurality of network switches interconnected by base network layer three (L3) links in a base network topology and also comprising an overlay network layer having a plurality of overlay switches interconnected by overlay network links in an overlay network topology;
a topology server interface configured to receive topology information for the base network layer;
an overlay controller interface configured to receive topology information for the overlay network layer;
a client interface configured to receive, from a client, a path request that specifies two endpoints and a requested bandwidth;
a service path engine configured to compute, in response to receiving the path request and using the topology information for the base network layer and the topology information for the overlay network layer, a computed path to transport network traffic between the two endpoints, wherein at least a portion of the computed path traverses the base network layer, and wherein a network switch of the plurality of network switches is an ingress network switch for the portion of the computed path,
wherein the topology server interface and overlay controller interface are further configured to receive, after the service path engine computes the computed path, additional topology information for at least one of the overlay network layer and the base network layer;
a network switch interface configured to receive from the network switch via a communication session, a failure event message indicating a failure of the portion of the computed path,
wherein the service path engine is configured to compute, in response to the failure event message and using the additional topology information, a new computed path that does not include the portion of the computed path,
wherein the network switch interface is configured to send new forwarding information for the new computed path to the network switch when the path computation element successfully computes the new computed path, and
wherein the client interface is configured to send, to the client, a path rejection when the path computation element is not able to compute the new computed path.

11. The path computation element of claim 10, wherein the failure event message comprises a path setup failure event message that indicates the network switch failed to establish the portion of the computed path.

12. The path computation element of claim 10, wherein the failure event message comprises a path failure event message that indicates the portion of the computed path established by the network switch has failed.

13. The path computation element of claim 10,
wherein the network switch interface is configured to configure an interface in the network switch for the portion of the computed path.

14. The path computation element of claim 10, wherein the new forwarding information for the new computed path causes the network switch to establish a label switched path over the portion of the computed path.

15. The path computation element of claim 10, wherein the failure event message comprises a label switched path state report message for a path computation element communication protocol (PCEP).

16. The path computation element of claim 10, wherein the path request specifies a start time for path activation, the path computation element further comprising:
a scheduler configured to schedule the new computed path as a scheduled path for the start time,
wherein the network switch interface is configured to send the new forwarding information for the new computed path to the network switch at the start time.

17. The path computation element of claim 16, further comprising:
a generated path database configured to store the scheduled path; and
a path manager that marks the scheduled path in the generated path database as active upon sending the new forwarding information.

18. A non-transitory computer-readable medium comprising instructions for causing one or more programmable processors of a path computation element to:
receive topology information for a base network layer of a multi-topology network, the multi-topology network comprising the base network layer having a plurality of network switches interconnected by base network layer three (L3) links in a base network topology and also comprising an overlay network layer having a plurality of overlay switches interconnected by overlay network links in an overlay network topology;
receive, from a client and via a client interface of the path computation element, a path request that specifies two endpoints and a requested bandwidth;
compute, in response to receiving the path request and using the topology information for the base network layer and the topology information for the overlay network layer, a computed path to transport network traffic between the two endpoints, wherein at least a portion of the computed path traverses the base network layer, and wherein a network switch of the plurality of network switches is an ingress network switch for the portion of the computed path;
after computation of the computed path, receive additional topology information for at least one of the overlay network layer and the base network layer;
receive, from the network switch via a communication session, a failure event message and using the additional topology information indicating a failure of the portion of the computed path;

compute, in response to the failure event message, a new computed path that does not include the portion of the computed path;

send new forwarding information for the new computed path to the network switch when the path computation element successfully computes the new computed path; and send, to the client via the client interface, a path rejection when the path computation element is not able to compute the new computed path.

* * * * *